United States Patent
Lee et al.

(10) Patent No.: US 10,497,972 B2
(45) Date of Patent: Dec. 3, 2019

(54) ELECTROLYTE, AND NEGATIVE ELECTRODE AND LITHIUM BATTERY INCLUDING THE SAME

(71) Applicant: Samsung Electronics Co., Ltd., Suwon-si, Gyeonggi-do (KR)

(72) Inventors: Yonggun Lee, Incheon (KR); Saebom Ryu, Suwon-si (KR); Toshinori Sugimoto, Hwaseong-si (KR); Wonseok Chang, Seoul (KR); Hongsoo Choi, Seoul (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 363 days.

(21) Appl. No.: 14/954,174

(22) Filed: Nov. 30, 2015

(65) Prior Publication Data

US 2016/0351956 A1     Dec. 1, 2016

(30) Foreign Application Priority Data

May 29, 2015 (KR) .......................... 10-2015-0076547

(51) Int. Cl.
*H01M 10/0565* (2010.01)
*H01M 10/052* (2010.01)
(Continued)

(52) U.S. Cl.
CPC ..... *H01M 10/0565* (2013.01); *H01M 2/1653* (2013.01); *H01M 2/1666* (2013.01);
(Continued)

(58) Field of Classification Search
CPC .................................................. H01M 10/056
See application file for complete search history.

(56) References Cited

U.S. PATENT DOCUMENTS

| 2010/0239918 A1 | 9/2010 | Pratt et al. |
| 2011/0136017 A1 | 6/2011 | Singh et al. |

(Continued)

FOREIGN PATENT DOCUMENTS

| EP | 2688133 A1 | 1/2014 |
| KR | 1020110115132 A | 10/2011 |

(Continued)

OTHER PUBLICATIONS

Gurevitch, et al., Nanocomposites of Titanium Dioxide and Polystyrene-Poly(ethylene oxide) Block Copolymer as Solid-State Electrolytes for Lithium Metal Batteries, Journal of The Electrochemical Society, 160 (9), pp. A1611-A1617 (2013).

(Continued)

*Primary Examiner* — Barbara L Gilliam
*Assistant Examiner* — Nathanael T Zemui
(74) *Attorney, Agent, or Firm* — Cantor Colburn LLP

(57) ABSTRACT

An electrolyte composition for a lithium battery includes a block copolymer and a nanoparticle composite dispersed in the block copolymer. The block copolymer includes a structural domain including a polymer having a structural repeating unit; and an ion conductive domain including a polymer having an ion conductive repeating unit, a rubbery domain including a polymer having a rubber repeating unit, or a hard domain comprising a polymer having an olefin-based repeating unit.

15 Claims, 11 Drawing Sheets

(51) Int. Cl.
    H01M 10/0567    (2010.01)
    H01M 10/0568    (2010.01)
    H01M 2/16       (2006.01)
(52) U.S. Cl.
    CPC ..... *H01M 10/052* (2013.01); *H01M 10/0567* (2013.01); *H01M 10/0568* (2013.01); *Y02T 10/7011* (2013.01)

(56) References Cited

U.S. PATENT DOCUMENTS

| | | | | |
|---|---|---|---|---|
| 2011/0206994 | A1* | 8/2011 | Balsara | H01M 10/0565 429/302 |
| 2013/0209893 | A1* | 8/2013 | Archer | H01M 10/052 429/317 |
| 2014/0011094 | A1* | 1/2014 | Park | H01M 4/386 429/307 |
| 2015/0044517 | A1* | 2/2015 | Mikhaylik | H01M 4/366 429/49 |
| 2016/0087306 | A1 | 3/2016 | Lee et al. | |
| 2016/0248100 | A1* | 8/2016 | Joo | H01M 4/405 |
| 2016/0294005 | A1 | 10/2016 | Lee et al. | |
| 2016/0329567 | A1 | 11/2016 | Lee et al. | |
| 2016/0336618 | A1 | 11/2016 | Lee et al. | |

FOREIGN PATENT DOCUMENTS

| | | |
|---|---|---|
| KR | 1020140027671 A | 3/2014 |
| KR | 1020140034879 A | 3/2014 |

OTHER PUBLICATIONS

Schaefer, et al., High Lithium Transference Number Electrolytes via Creation of 3-Dimensional, Charged, Nanoporous Networks from Dense Functionalized Nanoparticle Composites, Chemisty of Materials, Chem. Mater. 2013, 25, pp. 834-839.

Srivastava, et al., Tethered Nanoparticle-Polymer Composites: Phase Stability and Curvature, ACS Publications, American Chemical Society, Langmuir 2012, 28, pp. 6276-6281.

Zhou, et al., Improvements of photocurrent by using modified $SiO_2$ in the poly(ether urethane)/poly(ethylen oxide) polymer electrolyte for all-solid-state dye-sensitized solar cells, The Royal Society of Chem., 2009, pp. 3895-3897.

* cited by examiner

ELECTROLYTE, AND NEGATIVE ELECTRODE AND LITHIUM BATTERY INCLUDING THE SAME

CROSS-REFERENCE TO RELATED APPLICATION

This application claims priority to and the benefit of Korean Patent Application No. 10-2015-0076547, filed on May 29, 2015, and all the benefits accruing therefrom under 35 U.S.C. § 119, the content of which is incorporated herein in its entirety by reference.

BACKGROUND

1. Field

The present disclosure relates to an electrolyte composition for a lithium battery, and a negative electrode and a lithium battery including the electrolyte composition.

2. Description of the Related Art

Lithium secondary batteries are high performance secondary batteries that have high energy density, and which may be used in various fields, such as in an electric vehicle.

A negative electrode of the lithium secondary battery may be composed of a lithium metal or a lithium-containing alloy substrate. When a lithium metal or a lithium-containing alloy substrate is used as a negative electrode, contact between the negative electrode and a liquid electrolyte in the secondary battery is unstable due to high reactivity of the lithium. Also, dendrites are formed on the lithium negative electrode or the lithium-containing alloy substrate, and as a result the capacity and lifespan of the lithium secondary battery may deteriorate. Therefore, there is a need to improve the lithium secondary battery in this regard.

SUMMARY

Provided is an electrolyte for a lithium battery having excellent mechanical properties and improved ion conductivity at room temperature at the same time.

Provided is a negative electrode for a lithium battery including a protection layer including the electrolyte.

Provided is a lithium battery having excellent electrochemical characteristics by including the negative electrode.

Additional aspects of the present invention will be set forth in part in the description which follows and, in part, will be apparent from the description, or may be learned by practice of the presented exemplary embodiments.

According to an aspect of the present invention, an electrolyte for a lithium battery includes a block copolymer; and a nanoparticle composite dispersed in the block copolymer, wherein the block copolymer includes a structural domain comprising a polymer comprising a structural repeating unit; and an ion conductive domain comprising a polymer comprising an ion conductive repeating unit, a rubbery domain comprising a polymer comprising a rubber repeating unit, or a hard domain comprising a polymer comprising an olefin-based repeating unit.

According to an aspect of the present invention, a negative electrode for a lithium battery includes a lithium metal or a lithium-containing alloy substrate; and a protection layer including an electrolyte disposed on at least a portion of the substrate, wherein the electrolyte comprises a nanoparticle composite dispersed in a block copolymer, the block copolymer comprising a structural domain comprising a polymer comprising a structural repeating unit; and an ion conductive domain comprising a polymer comprising an ion conductive repeating unit, a rubbery domain comprising a polymer comprising a rubber repeating unit, or a hard domain comprising a polymer comprising an olefin-based repeating unit.

According to another aspect of the present invention, a lithium battery includes a positive electrode; a negative electrode; and an electrolyte disposed between the positive electrode and the negative electrode, wherein the electrolyte comprises a nanoparticle composite dispersed in a block copolymer, the block copolymer comprising a structural domain comprising a polymer comprising a structural repeating unit; and an ion conductive domain comprising a polymer comprising an ion conductive repeating unit, a rubbery domain comprising a polymer comprising a rubber repeating unit, or a hard domain comprising a polymer comprising an olefin-based repeating unit.

BRIEF DESCRIPTION OF THE DRAWINGS

The above and other advantages and features of this disclosure will become more apparent by describing in detail the exemplary embodiments thereof, in conjunction with the accompanying drawings in which.

DETAILED DESCRIPTION

Figure 1:
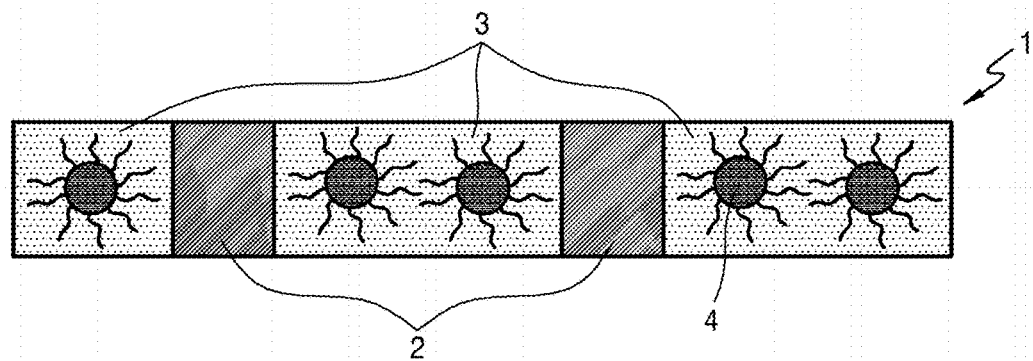
FIG. 1 is a schematic illustration of a structure of an exemplary embodiment of an electrolyte for a lithium battery.

Reference will now be made in detail to exemplary embodiments of an electrolyte for a lithium battery and to a negative electrode and a lithium battery including the electrolyte. In this regard, the present exemplary embodiments may have different forms and should not be construed as being limited to the descriptions set forth herein. Rather, these embodiments are provided so that this disclosure will be thorough and complete, and will fully convey the scope of the invention to those skilled in the art. The invention now will be described more fully hereinafter with reference to the accompanying drawings, in which various embodiments are shown. Like reference numerals refer to like elements throughout.

The terminology used herein is for the purpose of describing particular embodiments only and is not intended to be limiting. As used herein, the singular forms "a," "an," and "the" are intended to include the plural forms, including "at least one," unless the content clearly indicates otherwise. As used herein, the term "and/or" includes any and all combinations of one or more of the associated listed items. Expressions such as "at least one of," when preceding a list of elements, modify the entire list of elements and do not modify the individual elements of the list.

As used herein, the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10% or 5% of the stated value.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

As used herein, "disposed on" refers to elements which are directly disposed by direct contact with each other and indirectly disposed by including the presence of another region, feature, element and/or component.

As used herein, the term "a combination thereof" denotes a mixture or a combination including at least one element selected from a list of recited elements.

As used herein, the term "structural domain" refers to a region of a block copolymer that contributes to the mechanical strength of the block copolymer.

As used herein, the term "ion conductive domain" refers to a region of the block copolymer that contributes to the ion conductivity of the block copolymer.

As used herein, the term "rubbery domain" refers to a region of the block copolymer which contributes to the flexibility of the block copolymer. The rubbery domain may be impregnated with a liquid electrolyte.

As used herein, the term "hard domain" is a region of the block copolymer that contributes to the high mechanical strength of the block copolymer, in addition to the structural domain. The hard domain may also be impregnated with a liquid electrolyte.

According to an embodiment, an electrolyte for a lithium battery includes a block copolymer and a surface-modified nanoparticle composite dispersed in the block copolymer.

As used herein, the terms "nanoparticle composite," "surface modified nanoparticle," or "surface-modified nanoparticle composite" are used interchangeably, and refer to one or more nanoparticle having a surface to which a functional compound is attached. In some embodiments, the functional compound is directly attached to the surface of the nanoparticle.

As used herein, the term "functional compound" refers to "a compound having ion conductivity" or to "an ion conductive compound." The surface-modified nanoparticle composite may be homogeneously dispersed in the block copolymer. The dispersibility may be confirmed by SEM images that will be described. An ion conductivity of the electrolyte may be improved by the homogenous dispersion distribution.

As used herein, the term "particle size" refers to the average particle diameter. Particle sizes can be measured by any suitable methods known in the art to measure particle size by diameter.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Generally, an ion conductive polymer matrix, for example, a poly(ethylene oxide) ("PEO") matrix, may be used as an electrolyte. However, while the ion conductive polymer matrix displays excellent electrochemical performance at a high temperature of 60° C. or higher, the ion conductivity of the ion conductive polymer matrix is as low as $10^{-6}$ S/cm at room temperature.

This is because an ion conductive polymer matrix has high crystalline properties at room temperature and thus minimizes or prevents the movement of ions. Also, the ion conductive polymer matrix is highly reactive with a liquid electrolyte and may not be capable of preventing growth of lithium dendrites formed on a surface of an electrode of a lithium metal or a lithium-containing alloy substrate. Thus, when the ion conductive polymer matrix is used, electrochemical performance of a lithium battery may have problems.

In order to resolve the above-described problems, a technique of adding nanoparticles, such as $SiO_2$ or $TiO_2$, into the ion conductive polymer matrix has been developed. The presence of the nanoparticles in the electrolyte disturbs crystallization of the electrolyte, and thus ion conductivity and mechanical properties of the lithium battery may be improved.

However, due to their small size, the surface energy of the nanoparticles, such as $SiO_2$ or $TiO_2$, is high, and thus the nanoparticles may agglomerate to decrease the overall surface energy. As a result, the mechanical properties of the electrolyte may deteriorate, and the effect of the nanoparticles on reducing crystallinity of the electrolyte significantly decreases. Thus, electrochemical performance of the lithium battery including the electrolyte may deteriorate.

In an embodiment, the electrolyte for a lithium battery includes a block copolymer. The block copolymer may include at least one selected from i) a structural domain including a polymer that includes a structural repeating unit and an ion conductive domain including a polymer that includes an ion conductive repeating unit, ii) a structural domain including a polymer that includes a structural repeating unit and a rubbery domain including a polymer that includes a rubber repeating unit, and iii) a structural domain including a polymer that includes a structural repeating unit and a hard domain including a polymer that includes an olefin-based repeating unit. The domains of the block copolymer possess good mechanical properties such as elasticity, flexibility, and strength, while having excellent ion conductivity at the same time.

For example, the block copolymer may include at least one selected from ii) a structural domain including a polymer that includes a structural repeating unit and a rubbery domain including a rubber repeating unit and iii) a structural domain including a polymer that includes a structural repeating unit and a hard domain including a polymer that includes an olefin-based repeating unit. The block copolymers have good mechanical properties of flexibility, elasticity, and strength while not deteriorating ion conductivity and thus may effectively prevent the growth of dendrites on a surface of a lithium metal substrate or a lithium-containing alloy substrate. Therefore, the block copolymer may further satisfy the desired electrolyte characteristics as a protection layer.

The block copolymer may have number average molecular weight (Mn) in a range of about 10,000 Daltons to about 500,000 Daltons, specifically, about 10,000 Daltons to about 400,000 Daltons, more specifically, about 10,000 Daltons to about 300,000 Daltons, even more specifically about 10,000 Daltons to about 200,000 Daltons, and yet even more specifically, about 10,000 Daltons to about 100,000 Daltons.

The polymer block including the structural repeating unit, the polymer block including the ion conductive repeating unit, the polymer block including the rubber repeating unit, and the polymer block including an olefin-based repeating unit, may have a number average molecular weight (Mn) greater than or equal to about 10,000 Daltons, specifically, an Mn in a range of about 10,000 Daltons to about 500,000 Daltons, more specifically about 10,000 Daltons to about 400,000 Daltons, or, even more specifically about 10,000 Daltons to about 300,000 Daltons. When the block copolymer includes polymer blocks having the number average molecular weight within these ranges, the electrolyte may have good chemical and mechanical properties such as ion conductivity, flexibility, elasticity, and strength, due to an appropriate degree of polymerization.

The amount of the polymer block including the structural repeating unit or the amount of the polymer block including the ion conductive repeating unit, may be in a range of about 20 parts to about 50 parts by weight based on 100 parts by weight of the total weight of the block copolymer. More specifically, an amount of the polymer block including a structural repeating unit or the polymer block including an ion conductive repeating unit may be in a range of about 22 parts to about 43 parts by weight, even more specifically about 22 parts to about 40 parts by weight, or, yet even more specifically, about 22 parts to about 30 parts by weight based on 100 parts by weight of the total weight of the block copolymer. When an amount of the polymer block including the structural repeating unit or an amount of the polymer block including the ion conductive repeating unit is within these ranges, the electrolyte may have good mechanical properties such as strength or excellent ion conductivity.

An amount of the polymer block including a rubber repeating unit may be in a range of about 50 parts to about 80 parts by weight, or, more specifically, about 70 parts to about 78 parts by weight, based on 100 parts by weight of the total weight of the block copolymer. When the amount of the polymer block is within these ranges, an electrolyte including a block copolymer which includes the polymer block having the rubber repeating unit may have good flexibility and elasticity.

An amount of the polymer including an olefin-based repeating unit may be in a range of about 50 parts to about 80 parts by weight, or, more specifically, about 70 parts to about 78 parts by weight, based on 100 parts by weight of the block copolymer. When the amount of the polymer block including the olefin-based repeating unit is within these ranges, an electrolyte including a block copolymer which includes the polymer block may have improved flexibility and elasticity as well as rigidity.

The block copolymer may be at least one selected from a diblock copolymer (A-B) including a first block and a second block; and a triblock copolymer of (A-B-A' or B-A-B') including a first block, a second block, and a third block. The blocks A and A' may be the polymer block including a structural repeating unit. The polymer blocks A and A' may each be independently at least one polymer selected from hydrogenated polystyrene, polymethacrylate, poly(methylmethacrylate), polyvinylpyridine, polyvinylcyclohexane, polyimide, polyamide, poly(4-methyl pentene-1), poly(butyleneterephthalate), poly(isobutylmethacrylate), poly(ethyleneterephthalate), polydimethylsiloxane, polyacrylonitrile, polyvinylcyclohexane, polymaleic acid, polymaleic anhydride, poly(tertbutylvinylether), poly(cyclohexylmethacrylate), poly(cyclohexylvinylether), poly(tertbutylvinylether), polyvinylidenefluoride, and polydivinylbenzene, or may be a copolymer including at least two different structural repeating units that form the polymer.

The polymer block B may be a polymer block including an ion conductive repeating unit, a polymer block including a rubber repeating unit, or a polymer block including an olefin-based repeating unit. For example, the polymer block including an ion conductive repeating unit may be at least one selected from polyethylene oxide, polysiloxane, polypropylene oxide, polyethylene oxide grafted polymethylmethacrylate ("PEO grafted PMMA"), and polysiloxane grafted polymethylmethacrylate (polysiloxane grafted PMMA).

In an exemplary embodiment, the polymer block including a rubber repeating unit may be at least one selected from polyisoprene, polybutadiene, polychloroprene, polyisobutylene, and polyurethane.

In an exemplary embodiment, the polymer block including an olefin-based repeating unit may be at least one selected from polyethylene, polypropylene, and polybutylene.

In an exemplary embodiment, the block copolymer may include at least one selected from a diblock copolymer including a polystyrene first block and a polyisoprene second block, a triblock copolymer including a polystyrene first block, a polyisoprene second block, and a polystyrene third block, a diblock copolymer including a polystyrene first block and a polybutadiene second block, a triblock copolymer including a polystyrene first block, a polybutadiene second block, and a polystyrene third block, a diblock copolymer including a polystyrene first block and a polyethylene/polybutylene second block, and a triblock copolymer including a polystyrene first block, a polyethylene/polybutylene second block and a polystyrene third block.

FIG. 1 is a schematic illustration of a structure of an exemplary embodiment of an electrolyte for a lithium battery.

Referring to FIG. 1, the electrolyte includes a block copolymer 1, and the block copolymer 1 includes a surface-modified nanoparticle (i.e. nanoparticle composite) 4 that is dispersed in one of an ion conductive domain, a rubbery domain or a hard domain 3, adjacent to a structural domain 2.

In an exemplary embodiment, the block copolymer 1 may include the surface-modified nanoparticle composite 4 dispersed in the rubbery domain or in the hard domain 3 adjacent to the structural domain 2. In this case, since the surface-modified nanoparticle composite 4 is dispersed in a domain where the composite may be stably impregnated with a liquid electrolyte, ion conductive pathways may be evenly distributed in the block copolymer. As a result, excellent ion conductivity may be maintained in the block copolymer. In addition, interfacial characteristics between the block copolymer 1 and the substrate (i.e. a lithium metal substrate or a lithium-containing alloy substrate) may be improved. Moreover, when the surface-modified nanoparticle composite 4 is dispersed in either the rubbery domain or the hard domain of the block copolymer, the electrolyte possesses good mechanical properties such as flexibility, elasticity, and strength, and as a result, dendrite growth on a surface of the lithium metal substrate or the lithium-containing alloy substrate may be effectively prevented. Thus, a lithium battery including the electrolyte may have improved electrochemical characteristics such as increased capacity, improved lifespan characteristics, and increased rate capability.

In an exemplary embodiment, a type of the block copolymer may include a lamellar type, a cylinder type, or a gyroid type, but is not limited thereto.

The block copolymer may be prepared using known polymerization processes such as atom transfer radical polymerization ("ATRP") or reversible addition fragmentation chain transfer ("RAFT") polymerization, but is not limited thereto, and the block polymer may be prepared by using a preparation method used in the art.

The nanoparticle composite may include nanoparticles having a surface to which an ion conductive compound is attached. The ion conductive compound may be an ion conductive oligomer or a polymer, an ionic salt, or a combination thereof. When the nanoparticle composite includes an ion conductive compound having a high level of ion conductivity attached to a surface of the nanoparticle, the rubbery domain, the hard domain or the ion conductive domain of the block copolymer may also have high levels of ion conductivity, and thus an electrolyte including the block copolymer with the nanoparticle composited dispersed therein, may have improved ion conductivity at room temperature.

The ion conductive oligomer or polymer may include, for example, a repeating unit containing oxygen, such as, for example, alkylene oxide, alkylene glycol, or siloxane. In an exemplary embodiment, the ion conductive oligomer or polymer may include at least one selected from poly(ethylene oxide) ("PEO"), poly(propyleneoxide) ("PPO"), poly(butyleneoxide) ("PBO"), poly(siloxane), poly(ethyleneglycol) ("PEG"), poly(propyleneglycol) ("PPG"), poly(oxyethylenemethacrylate) ("POEM"), poly(ethyleneglycol)diacrylate ("PEGDA"), poly(propyleneglycol)diacrylate ("PPGDA"), poly(ethyleneglycol)dimethacrylate ("PEGDMA"), poly(propyleneglycol)dimethacrylate ("PPGDMA"), poly(ethyleneglycol)urethane diacrylate, poly(ethyleneglycol) urethane dimethacrylate, polyester diacrylate, polyester dimethacrylate, poly(ethyleneglycol)urethane triacrylate, poly(ethyleneglycol)urethane trimethacrylate, trimethylolpropane triacrylate, trimethylolpropane trimethacrylate, poly(ethyleneoxide) grafted poly(methylmethacrylate) ("PEO grafted PMMA"), poly(propyleneoxide) grafted poly (methylmethacrylate) ("PPO grafted PMMA"), poly(butyleneoxide) grafted poly(methylmethacrylate) ("PBO grafted PMMA"), polysiloxane grafted poly(methylmethacrylate) ("polysiloxane grafted PMMA"), poly(ethylene glycol) grafted poly(methylmethacrylate) ("PEG grafted PMMA"), poly(propylene glycol) grafted poly(methylmethacrylate) ("PPG grafted PMMA"), ethoxy-substituted trimethylolpropane triacrylate, and propoxy-substituted trimethylolpropane triacrylate.

The ion conductive oligomer or polymer may have a weight average molecular weight in a range of about 50 to about 20,000 Daltons, or, more specifically, about 50 to about 1,000 Daltons. When the weight average molecular weight (Mw) of the ion conductive oligomer or polymer is within these ranges, the ion conductive oligomer or polymer may be in a liquid or liquid-like form that may be easily impregnated with a liquid electrolyte, and thus preparation and handling of the ion conductive oligomer or polymer may also be easy. Also, when the weight average molecular weight (Mw) of the ion conductive oligomer or polymer is within these ranges, dispersibility of the nanoparticle composite in the block copolymer is improved, and thus the ion conductive effects of nanoparticle composite may also improve.

The ionic salt may be a salt including an anion coupled with a lithium cation and tethered (i.e. attached) to a surface of the nanoparticle. In an exemplary embodiment, the ionic salt may include at least one selected from $LiSO_3$ and $Li(SO_3BF_3)$. The ionic salt may be combined with the ion conductive oligomer or polymer to provide a compound having high ion conductivity. For example, the combination may be formed by linking the anion coupled with the lithium cation to a surface of the nanoparticle composite via the ion conductive oligomer or polymer chains.

The ionic salt has a good ion-pair dissociation property and thus may have a high lithium ion mobility, wherein a lithium ion mobility ($t_{Li}^+$) is almost 1 as calculated by Equation 1:

$$t_{Li}^+ = t_{cation}/(t_{cation} + t_{anion})$$ [Equation 1]

Here, $t_{cation}$ denotes the number of elements of cations in the electrolyte, $t_{anion}$ denotes the number of anions in electrolyte, and $t_{anion} + t_{cation}$ denotes the sum of the numbers of the elements of cations and anions in the electrolyte.

When lithium ion mobility is almost 1, dendrite growth on the surface of the lithium metal or the lithium-containing alloy substrate may be impeded. Also, electrochemical characteristics, such as capacity, lifespan characteristics, and rate capability of the lithium battery including the electrolyte may be improved.

In an exemplary embodiment, the nanoparticles of the nanoparticle composite may include at least one selected from $SiO_2$, $Al_2O_3$, $TiO_2$, $ZnO$, $BaTiO_3$, and a lithium ion conductor.

The lithium ion conductor may include at least one compound represented by Formula 1:

$Li_{1+x}M_xM'_{2-x}(PO_4)_3$ [Formula 1]

In Formula 1,
M may be Al, Cr, Ga, Fe, Sc, In, Y, La, or Sc, M' may be Ti, Ge, or Zr, and 0<x≤0.7.

In an exemplary embodiment, the lithium ion conductor may include a compound represented by Formula 2:

$Li_{1+x}Al_xGe_yTi_{2-x-y}(PO_4)_3$ [Formula 2]

In Formula 2,
0<x≤0.7, and 0<y≤0.5.

In an exemplary embodiment, the lithium ion conductor may include $Li_{1.4}Al_{0.4}Ge_{0.2}Ti_{1.4}(PO_4)_3$.

An average particle diameter of the nanoparticles of the nanoparticle composite may be in a range of about 1 nanometer (nm) to about 1 micrometer (μm), or, more specifically, about 10 nm to about 500 nm, or, even more specifically, about 50 nm to about 300 nm. When the average particle diameter of the nanoparticles is within these ranges, the nanoparticle composite may be easily handled, thus improving manufacture of the nanoparticle composite dispersed in the block copolymer. Also, when the ion conductivity is maintained, the electrolyte may have excellent mechanical properties.

The amount of the nanoparticle composite may be in a range of about 5 parts to about 500 parts by weight, or, specifically, about 10 parts to about 300 parts by weight, or, more specifically, about 50 parts to about 200 parts by weight, based on 100 parts by weight of the block copolymer. When the amount is within these ranges, an electrolyte including the nanoparticle composite may have improved mechanical properties such as ion conductivity, flexibility, elasticity, and rigidity. Also, for a lithium battery which includes a protection layer including the electrolyte, the protection layer prevents direct contact with a lithium metal or lithium-containing alloy substrate, and thus the lithium battery may have improved initial discharge capacity, capacity retention rate, and rate capability.

An amount of the ion conductive oligomer or polymer may be in a range of about 5 parts to about 20 parts by weight based on 100 parts by weight of the total weight of the nanoparticles of the nanoparticle composite. When the amount of the ion conductive oligomer or polymer is within this range, the electrolyte may have improved ion conductivity while having excellent mechanical properties.

In an exemplary embodiment, the nanoparticle composite may include one of a $SiO_2$-PEG nanoparticle composite ($SiO_2$ nanoparticle surface tethered with poly(ethylene glycol) (PEG), a $Al_2O_3$-PEG nanoparticle composite (an $Al_2O_3$ nanoparticle surface tethered with poly(ethylene glycol) (PEG), a $TiO_2$-PEG nanoparticle composite (a $TiO_2$ nanoparticle surface tethered with poly(ethylene glycol) (PEG), and a LAGTP-PEG nanoparticle composite (a lithium aluminum germanium titanium phosphate (LAGTP) nanoparticle surface tethered with poly(ethylene glycol) (PEG). The LAGTP nanoparticle may be, for example, $Li_{1.4}Al_{0.4}Ge_{0.2}Ti_{1.4}(PO_4)_3$.

The method used to prepare the nanoparticle composite may be a sol-gel method, but is not limited thereto. In an exemplary embodiment, a method of preparing a nanoparticle composite includes mixing a nanoparticle precursor with an organic solvent to prepare a mixture, preparing a solution in a sol state by mixing the mixture with the ion conductive oligomer or polymer, and adding a basic solution to the solution so that the pH of the solution may be increased to a pH of about 4 to proceed with gelation. The nanoparticle composite may be easily prepared using the described method.

The electrolyte may further include at least one selected from a lithium salt and an ionic liquid, wherein the lithium salt may be at least one selected from LiSCN, $LiN(CN)_2$, $LiClO_4$, $LiBF_4$, $LiAsF_6$, $LiPF_6$, $LiCF_3SO_3$, $Li(CF_3SO_2)_2N$, $Li(CF_3SO_2)_3C$, $LiN(SO_2F)_2$, $LiN(SO_2C_2F_5)_2$, $LiN(SO_2CF_3)_2$, $LiN(SO_2CF_2CF_3)_2$, $LiSbF_6$, $LiPF_3(CF_2CF_3)_3$, $LiPF_3(C_2F_5)_3$, $LiPF_3(CF_3)_3$, and $LiB(C_2O_4)_2$.

The amount of lithium salt may be in a range of about 10 parts to about 70 parts by weight, or, more specifically, about 10 parts to about 50 parts by weight, or, even more specifically, about 10 parts to about 30 parts by weight, based on 100 parts by weight of the block copolymer. When the amount of the lithium salt is within these ranges, the ion conductivity of the electrolyte may be improved.

The ionic liquid refers to an ionic salt in a liquid state at room temperature or a room-temperature molten salt that has a melting point at room temperature or lower and is formed of ions. The ionic liquid may be a compound including at least one cation and at least one anion. The cation may be at least one selected from an ammonium-based cation, a pyrrolidinium-based cation, pyridinium-based cation, a pyrimidinium-based cation, an imidazolium-based cation, a piperidinium-based cation, a pyrazolium-based cation, an oxazolium-based cation, a pyridazinium-base cation, a phosphonium-based cation, a sulfonium-based cation, and a triazol-based cation, and a mixture thereof and the anion may be at least one of $BF_4^-$, $PF_6^-$, $AsF_6^-$, $SbF_6^-$, $AlCl_4^-$, $HSO_4^-$, $ClO_4^-$, $CH_3SO_3^-$, $CF_3CO_2^-$, $(CF_3SO_2)_2N^-$, $(FSO_2)_2N^-$, $Cl^-$, $Br^-$, $I^-$, $SO_4^-$, $CF_3SO_3^-$, $(C_2F_5SO_2)_2N^-$, and $(C_2F_5SO_2)(CF_3SO_2)N^-$.

For example, the ionic liquid may be at least one selected from N-methyl-N-propylpyrrolidinium bis(trifluoromethanesulfonyl)imide, N-butyl-N-methylpyrrolidinium bis(3-trifluoromethylsulfonyl)imide, 1-butyl-3-methylimidazolium bis(trifluoromethylsulfonyl)amide, and 1-ethyl-3-methylimidazolium bis(trifluoromethylsulfonyl)amide.

An amount of the ionic liquid may be in a range of about 5 parts to about 40 parts by weight, or, more specifically, about 10 parts to about 30 parts by weight, based on 100 parts by weight of the block copolymer. When the amount of the ionic liquid is within these ranges, the electrolyte may have good ion conductivity and good mechanical properties.

When the electrolyte contains both the lithium salt (Li) and the ionic liquid ("IL"), a molar ratio (IL:Li) of the ionic liquid (IL) to the lithium ion (Li) may be in a range of about 0.1 to about 2.0, or, more specifically, about 0.2 to about 1.8, or, even more specifically, about 0.4 to about 1.5. When the molar ratio of IL:Li in the electrolyte is within these ranges, the lithium ion mobility and ion conductivity of the electrolyte may be excellent. The mechanical properties of the electrolyte may also be excellent, and thus dendrite growth on a surface of a negative electrode may be effectively suppressed.

In an exemplary embodiment, the ion conductivity of the electrolyte may be about $1 \times 10^{-4}$ Siemens per centimeter (S/cm) or higher as measured at 25° C. The electrolyte may have good ion conductivity at room temperature.

The electrolyte may be prepared in the form of a free standing layer.

The electrolyte may be used as solid polymer electrolyte for an all-solid battery. The electrolyte may be used as an electrolyte of a lithium secondary battery, such as a lithium air battery, a lithium ion battery, or a lithium polymer battery.

According to another exemplary embodiment, a negative electrode for a lithium battery may include a substrate including a lithium metal or lithium-containing alloy; and a protection layer disposed on at least a portion of the substrate, and where the protection layer includes an electrolyte for a lithium battery.

Figure 2:
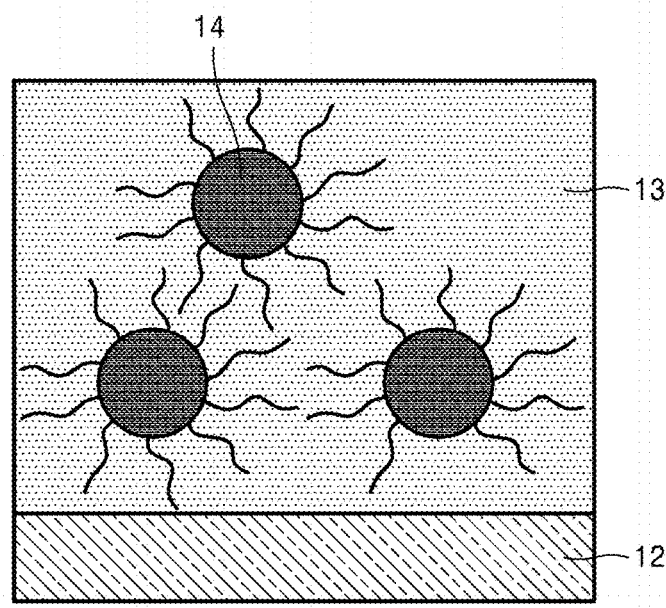
FIG. 2 is a schematic illustration of a structure of an exemplary embodiment of a negative electrode for a lithium battery.

FIG. 2 is a schematic view of a structure of a negative electrode 12 for a lithium battery according to an embodiment. Referring to FIG. 2, a protection layer 13 is disposed on a substrate of the negative electrode 12, and a surface-modified nanoparticle composite 14 is dispersed in the protection layer 13. Due to the presence of the surface-modified nanoparticle composite 14 dispersed in the protection layer 13, ion conductivity and mechanical properties of the negative electrode 12 are improved, and thus the formation of dendrites on the substrate may be effectively suppressed. Also, the protection layer 13 disposed on the lithium metal or lithium-containing alloy substrate prevents direct contact between a liquid electrolyte (not shown) and the substrate, and thus electrochemical characteristics, such as initial discharge capacity, lifespan characteristics, and rate capability of the negative electrode 12 may improve.

A thickness of the protection layer may be in a range of about 0.5 μm to about 5 μm, or, more specifically, about 1 μm to about 3 μm. The protection layer is a thin film that is stable with respect to a liquid electrolyte, has good mechanical properties such as strength and flexibility, and may have improved ion conductivity. Thus, a lithium battery including the protection layer may have improved electrochemical characteristics such as capacity and lifespan.

In the negative electrode, an interfacial resistance ($R_i$) between a lithium metal substrate and the protection layer may be reduced about 15% or more than that of a bare lithium metal substrate, where the interfacial resistance may be derived from a Nyquist plot obtained from impedance measurement at a temperature of 25° C. When the electrolyte is used as a protection layer for a substrate composed of lithium metal or a lithium-containing alloy, an interfacial resistance is reduced as compared to that of a lithium metal substrate alone, and thus interfacial characteristics of the negative electrode 12 may be improved.

The protection layer may further include at least one selected from an ionic liquid, a polymer ionic liquid, and an oligomer. The inclusion of at least one of an ionic liquid, a polymer ionic liquid, and an oligomer in the protection layer, may improve ion conductivity at room temperature.

Hereinafter, a method of preparing a negative electrode for a lithium battery will be described.

First, a composition for forming a protection layer is prepared which includes a block copolymer including at least one selected from (i) a structural domain and an ion conductive domain, (ii) a structural domain and a rubbery domain, and (iii) a structural domain and a hard domain.

An organic solvent may be added to the composition. The organic solvent may be any suitable material known in the art. Examples of the organic solvent may include tetrahydrofuran, N-methylpyrrolidone, acetonitrile, benzonitrile, 2-methyltetrahydrofuran, γ-butyrolactone, dioxolane, 4-methyldioxolane, N,N-dimethylformamide, N,N-dimethylacetamide, N,N-dimethylsulfoxide, dioxane, 1,2-dimethoxyethane, sulfolane, dichloroethane, chlorobenzene, nitrobenzene, diethyleneglycol, dimethyl ether, or a mixture thereof. The amount of the organic solvent may be in a range of about 100 parts to about 3000 parts by weight based on 100 parts by weight of the block copolymer.

The composition for forming a protection layer may further include at least one selected from an ionic liquid, a polymer ionic liquid, and an oligomer.

The composition for forming a protection layer may be applied and dried on at least a portion of a surface of a substrate formed from a lithium metal or lithium-containing alloy to prepare a negative electrode.

The coating method used to apply the composition may be any method known in the art used to form a protection layer. Examples of coating methods may include spin coating, roll coating, curtain coating, extruding, casting, screen printing, inkjet printing, or use of a doctor blade.

According to another embodiment, a lithium battery may include a positive electrode, the negative electrode, and an electrolyte disposed between the positive electrode and the negative electrode.

Figure 3A:
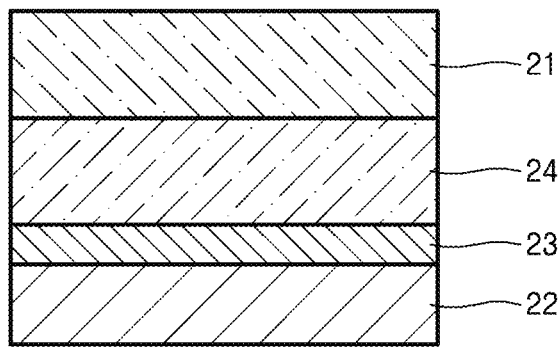
FIGS. 3A to 3C are schematic illustrations of a structure of an exemplary lithium battery.
Figure 3B:
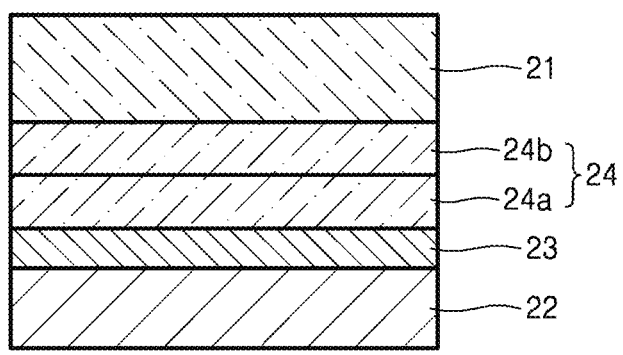
Figure 3C:
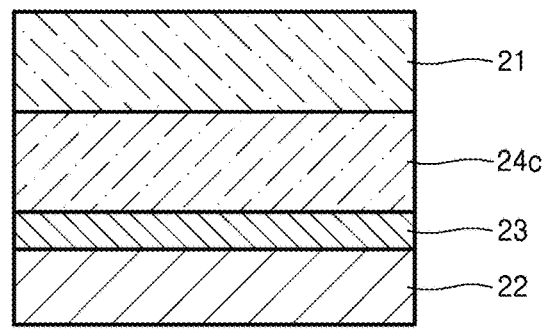

FIGS. 3A to 3C are schematic illustrations of a structure of an exemplary embodiment of a lithium battery.

As shown in FIG. 3A, the lithium battery has a structure including a protection layer 23 disposed between a positive electrode 21 and a negative electrode 22. An interlayer 24 may be included between the protection layer 23 and the positive electrode 21. The composition of the interlayer 24 may be different from that of the protection layer 23, and may include at least one selected from a liquid electrolyte, a polymer ionic liquid, a solid electrolyte, a gel electrolyte, and a separator.

When the protection layer 23 is disposed on at least a portion of a surface of the negative electrode 22, the surface of the negative electrode 22 may be both mechanically stabilized and electrochemically stabilized. Thus, dendrite formation on the surface of the negative electrode 22 during charging and discharging of the lithium battery may be suppressed, and interfacial stability between the negative electrode 22 and the protection layer 23 may be improved. Accordingly, cycle characteristics of the lithium battery may also be improved.

The protection layer 23 completely covers the surface of the negative electrode 22. In this regard, there is direct contact between the surface of the negative electrode 22 and the surface of the protection layer. Accordingly, reactivity between an electrolyte that is highly reactive and the surface of the negative electrode 22 may be blocked. Accordingly, the negative electrode 22 may be protected, and the stability of the negative electrode 22 may be increased.

The interlayer 24 may have a two-layered structure in which a liquid electrolyte layer 24a and a solid electrolyte layer 24b are sequentially stacked as shown in FIG. 3B, where an liquid electrolyte layer 24a may be disposed adjacent to the protection layer 23 and adjacent to a solid electrolyte layer 24b. The lithium secondary battery may have a structure as shown in FIG. 3B including, a negative electrode 22/an electrolyte protection layer 23/an interlayer 24 (a liquid electrolyte 24a/a solid electrolyte 24b)/a positive electrode 21, which are sequentially stacked in this stated order.

Referring to FIG. 3C, the lithium battery according to an embodiment may alternatively include a separator 24c as an interlayer. The separator 24c may have a multi-layer structure including at least two layers of polyethylene, polypropylene, or polyvinylidene fluoride, and a mixed multi-layer structure may be used. Examples of the mixed multi-layer structure include a two-layer separator of polyethylene/polypropylene, a three-layer separator of polyethylene/polypropylene/polyethylene, and a three-layer separator of polypropylene/polyethylene/polypropylene. The separator 24c may further include an electrolyte containing a lithium salt and an organic solvent.

The electrolyte may be at least one selected from a liquid electrolyte, a solid electrolyte, a gel electrolyte, and a polymer ionic liquid.

The liquid electrolyte may include at least one organic solvent selected from ethylene carbonate, propylene carbonate, dimethyl carbonate, diethyl carbonate, ethylmethyl carbonate, fluoroethylene carbonate, gamma butyrolactone, 1,2-dimethoxy ethane, diepoxyethane, dimethylene glycol dimethylether, trimethylene glycol dimethylether, tetraethylene glycol dimethylether, polyethylene glycol dimethylether, succinonitrile, sulfolane, dimethylsulfone, ethylmethylsulfone, diethylsulfone, adiponitrile, 1,1,2,2-tetrafluoroethyl 2,2,3,3-tetrafluoropropyl ether, and tetraphenylethane 2,2,2-trifluoroethanol.

The liquid electrolyte may be impregnated in a domain of a block copolymer that is at least one selected from an ion conductive domain including a polymer including an ion conductive repeating unit, a rubbery domain including a polymer including a rubbery repeating unit, and a hard domain including a polymer including an olefin-based repeating unit.

Figure 4:
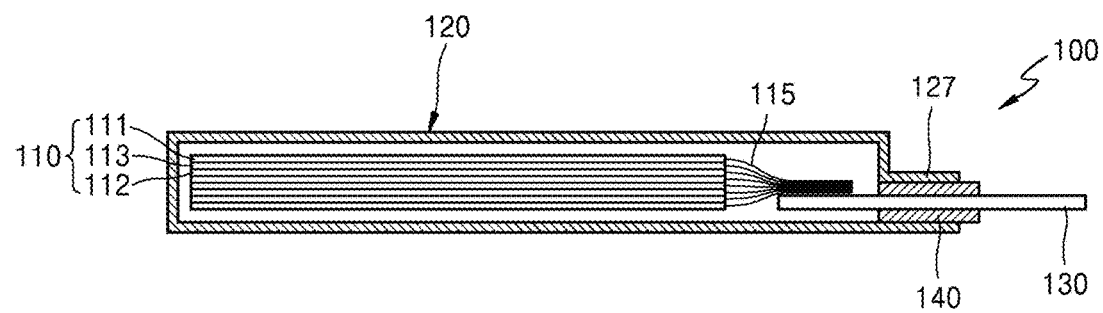
FIG. 4 is a schematic cross-sectional view of structure of an exemplary pouch-type lithium secondary battery.

FIG. 4 is a schematic illustration of a structure of an exemplary embodiment of a pouch type, lithium secondary battery 100.

Referring to FIG. 4, the exemplary pouch type lithium secondary battery 100 includes an electrode assembly 110, a lead tab 130, and an external member 120 including an electrolyte solution adding inlet (not shown). The pouch type lithium secondary battery 100 is a secondary battery that may be re-charged. An example of the pouch type lithium secondary battery 100 may be a lithium-ion battery.

The electrode assembly 110 is accommodated within the external member 120. The electrode assembly 110 includes a positive electrode plate 111, a negative electrode plate 112, and a separator 113 disposed between the positive electrode plate 111 and the negative electrode plate 112. The electrode assembly 110 may be a stack type electrode assembly in which the positive electrode plate 111, the separator 113, and the negative electrode plate 112 are sequentially stacked in this stated order. In order to provide the pouch type lithium secondary battery 100 having a high output and a large capacity, a plurality of sheets of the positive electrode plates 111, the separators 113, and the negative electrode plates 112 may be stacked.

The positive electrode plate 111 may be formed by coating a surface of a positive electrode current collector using a material such as aluminum with a positive electrode active material.

Examples of the positive electrode active material may include at least one material selected from a lithium cobalt oxide, a lithium nickel cobalt manganese oxide, a lithium nickel cobalt aluminum oxide, a lithium iron phosphate, and a lithium manganese oxide, but not limited thereto, and any positive electrode active material available in the art may be used.

In an exemplary embodiment, the positive electrode active material may be a compound represented by one of the following formulae: $Li_aA_{1-b}B'_bD'_2$ (where, $0.90 \leq a \leq 1.8$ and $0 \leq b \leq 0.5$); $Li_aE_{1-b}B'_bO_{2-c}D'_c$ (where, $0.90 \leq a \leq 1.8$, $0 \leq b \leq 0.5$, and $0 \leq c \leq 0.05$); $LiE_{2-b}B'_bO_{4-c}D'_c$ (where, $0 \leq b \leq 0.5$ and $0 \leq c \leq 0.05$); $Li_aNi_{1-b-c}Co_bB'_cD'_\alpha$ (where, $0.90 \leq a \leq 1.8$, $0 \leq b \leq 0.5$, $0 \leq c \leq 0.05$, and $0 < \alpha \leq 2$); $Li_aNi_{1-b-c}Co_bB'_cO_{2-\alpha}F'_\alpha$ (where, $0.90 \leq a \leq 1.8$, $0 \leq b \leq 0.5$, $0 \leq c \leq 0.05$, and $0 < \alpha < 2$); $Li_aNi_{1-b-c}Co_bB'_cO_{2-\alpha}F'_\alpha$ (where, $0.90 \leq a \leq 1.8$, $0 \leq b \leq 0.5$, $0 \leq c \leq 0.05$, and $0 < \alpha < 2$); $Li_aNi_{1-b-c}Mn_bB'_cD'_\alpha$ (where, $0.90 \leq a \leq 1.8$, $0 \leq b \leq 0.5$, $0 \leq c \leq 0.05$, and $0 < \alpha \leq 2$); $Li_aNi_{1-b-c}Mn_bB'_cO_{2-\alpha}F'_\alpha$ (where, $0.90 \leq a \leq 1.8$, $0 \leq b \leq 0.5$, $0 \leq c \leq 0.05$, and $0 < \alpha < 2$); $Li_aNi_bE_cG_dO_2$ (where, $0.90 \leq a \leq 1.8$, $0 \leq b \leq 0.9$, $0 \leq c \leq 0.5$, and $0.001 \leq d \leq 0.1$); $Li_aNi_bCo_cMn_dG_eO_2$ (where, $0.90 \leq a \leq 1.8$, $0 \leq b \leq 0.5$, $0 \leq c \leq 0.5$, $0 \leq d \leq 0.5$, and $0.001 \leq e \leq 0.1$); $Li_aNiG_bO_2$ (where, $0.90 \leq a \leq 1.8$, $0.001 \leq b \leq 0.1$); $Li_aCoG_bO_2$ (where, $0.90 \leq a \leq 1.8$ and $0.001 \leq b \leq 0.1$); $Li_aMnG_bO_2$ (where, $0.90 \leq a \leq 1.8$ and $0.001 \leq b \leq 0.1$); $Li_aMn_2G_bO_4$ (where, $0.90 \leq a \leq 1.8$ and $0.001 \leq b \leq 0.1$); $QO_2$; $QS_2$; $LiQS_2$; $V_2O_5$; $LiV_2O_5$; $LiI'O_2$; $LiNiVO_4$; $Li_{(3-f)}J_2(PO_4)_3$ (where, $0 \leq f \leq 2$); $Li_{(3-f)}Fe_2(PO_4)_3$ (where, $0 \leq f \leq 2$); and $LiFePO_4$.

In the above formulae, A is Ni, Co, or Mn; B' is Al, Ni, Co, Mn, Cr, Fe, Mg, Sr, V, or a rare earth element; D' is O, F, S, or P; E is Co, or Mn; G is Al, Cr, Mn, Fe, Mg, La, Ce, Sr, or V; Q is Ti, Mo, or Mn; I' is Cr, V, Fe, Sc, or Y; and J is V, Cr, Mn, Co, Ni, or Cu.

A positive electrode active material composition including a mixture of the positive electrode active material, a binder, and a solvent is prepared.

A conducting agent may be further added to the positive electrode active material composition.

The positive electrode active material composition is directly coated and dried on a metal current collector to prepare a positive electrode plate. Alternatively, the positive electrode active material composition may be cast on a separate support, and then the film may be detached from the support and laminated on a metal current collector to prepare a positive electrode plate.

In the positive electrode active material composition, the conducting agent, the binder, and the solvent may be the same as described in the preparation of the negative electrode active material composition. A plasticizer may be further added to the positive electrode active material composition and/or the negative electrode active material composition to form pores in an electrode plate.

Amounts of the positive electrode active material, the conducting agent, the binder, and the solvent used herein may be at levels suitable for a lithium battery. According to a purpose and structure of the lithium battery, one or more of the conducting agent, the binder, and the solvent may be omitted.

The negative electrode plate 112 may be formed by coating a negative electrode active material on a surface of a negative electrode current collector formed of a material such as nickel. The negative electrode active material may be a carbonaceous material comprising at least one selected from silicon, a silicon oxide, a silicon-based alloy, a silicon-carbonaceous material composite, tin, a tin-based alloy, a tin-carbon composite, a metal oxide, or a combination thereof.

The carbonaceous material may be crystalline carbon, amorphous carbon, or a mixture thereof. Examples of the crystalline carbon may include graphite such as natural graphite or artificial graphite in amorphous, disk-shaped, flake, spherical, or fibrous form, and examples of the amorphous carbon may include soft carbon (carbon sintered at low temperature), hard carbon, meso-phase pitch carbides, sintered cokes, graphene, carbon black, fullerene soot, carbon nanotubes, and carbon fibers, but is not limited thereto, and any material available as a carbonaceous material known in the art may be used.

The negative electrode active material may be selected from Si, $SiO_x$ (where, $0 < x < 2$, or, specifically, $0.5 < x < 1.5$), Sn, $SnO_2$, a silicon-containing metal alloy, and a mixture thereof. A metal for forming the silicon-containing metal alloy may be at least one selected from Al, Sn, Ag, Fe, Bi, Mg, Zn, in, Ge, Pb, and Ti.

The negative electrode active material may include a metal/semi-metal alloyable with lithium, an alloy of the metal/semi-metal, or an oxide of the metal/semi-metal. Examples of the metal/semimetal alloyable with lithium may include Si, Sn, Al, Ge, Pb, Bi, Sb, a Si—Y' alloy (where, Y' is an alkali metal, an alkali earth metal, a Group 13 element, a Group 14 element, a transition metal, or a rare-earth element, but Y' is not Si), a Sn—Y' alloy (where, Y' is an alkali metal, an alkali earth metal, a Group 13 element, a Group 14 element, a transition metal, a rare-earth element, but Y' is not Sn), and $MnO_x$ (where, $0 < x \leq 2$). Examples of the element Y' may include Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Ti, Ge, P, As, Sb, Bi, S, Se, Te, Po, or a combination thereof. Examples of the oxide of the metal/semi metal alloyable with lithium may include a lithium titanium oxide, a vanadium oxide, a lithium vanadium oxide, $SnO_2$, and $SiO_x$ (where, 0<x<2).

In an exemplary embodiment, the negative electrode may be a lithium metal thin film or a lithium-containing metal thin film.

Amounts of the negative electrode active material, the conducting agent, the binder, and the solvent used herein may be used at levels suitable for a lithium battery.

In an embodiment, the electrode may be used as an electrode in the lithium battery. The electrolyte may be disposed between the positive electrode plate 111 and the negative electrode plate 112. Also, the electrolyte may be disposed on the negative electrode plate 112 as an electrode protection layer.

The separator 113 that is generally used in a lithium secondary battery may be used in addition to the electrolyte.

The separator 113 may be an insulating thin film that has a high ion permeability and mechanical strength. A pore diameter of the separator 113 may be generally in a range of about 0.01 μm to about 10 μm, and a thickness may be in a range of about 5 μm to about 20 μm. The separator 113 may be, for example, an olefin-based polymer such as polypropylene, or a sheet or non-woven fabric formed of glass fibers or polyethylene. When a solid polymer electrolyte is used as the electrolyte, the solid polymer electrolyte may also serve as a separator.

The separator 113 may have a multi-layer structure including at least two layers of polyethylene, polypropylene, or polyvinylidene fluoride, and a mixed multi-layer structure may be used. Examples of the mixed multi-layer structure may include a two-layer separator of polyethylene/polypropylene, a three-layer separator of polyethylene/polypropylene/polyethylene, and a three-layer separator of polyprolyene/polyethylene/polypropylene.

In an exemplary embodiment, the lithium secondary battery has an improved capacity and lifespan characteristics and thus may be used as a unit battery in a medium-to-large sized battery pack or a battery module including a plurality of battery cells that are used as a power source of a medium-to large sized device, or as a power source of a small-sized device.

Examples of the medium-to large sized device may include an electric vehicle ("EV"), a hybrid electric vehicle ("HEV"), and a plug-in hybrid electric vehicle ("PHEV") as well as electric bicycles including an electric bike (E-bike) and an electric scooter (E-scooter), an electric tool, and an electric power storage device, but are not limited thereto.

Electrode tabs 115 may be electrically connected to each of the positive electrode plate 111 and the negative electrode plate 112. The electrode tabs 115 extended from the positive electrode plate 111 and the negative electrode plate 112 may overlap. The tightly packed electrode tabs 115 may be electrically connected with the lead tab 130. For example, the electrode tab 115 and the lead tab 130 may be bonded by ultrasound welding.

The lead tab 130 extends outwardly from an upper part of the external member 120 and may be surrounded by a tab tape 140 to improve a sealing property with the external member 120 and provide electrical insulation with respect to the external member 120.

Although an exemplary embodiment of the pouch type lithium secondary battery has been described as including a stack type of the electrode assembly 110, the battery is not limited thereto. For example, the electrode assembly 110 may be a jelly-roll type electrode assembly that is prepared by stacking a positive electrode plate, a separator, and a negative electrode plate and rolling the stack into the form of a jelly roll.

The external member 120 is a pouch type member which includes an internal space for accommodating the electrode assembly 110 and an electrolyte solution. In an exemplary embodiment, a surface of the external member 120 exposed to the outside and an inner surface facing the electrode assembly 110 accommodated in the external member 120 may be an insulating metal thin film. For example, the external member 120 may include a material such as aluminum or stainless steel.

The external member 120 may include an electrolyte solution adding inlet (not shown) that protrudes from one side of the external member 120.

One or more embodiments will now be described in more detail with reference to the following examples. However, these examples are not intended to limit the scope of the invention.

EXAMPLE

Preparation Example 1

Preparation of Nanoparticle Composite ($SiO_2$-$PEG_{500}$) Including $SiO_2$ Nanoparticle Surface Tethered with poly(ethyleneglycol)(PEG)

0.18 mole of 98% tetraethoxy silane ($Si(OC_2H_5)_4$) (TEOS) (available from Aldrich) was added to 100 ml of 0.01 N HCl, and mixed with 25 ml of ethanol to obtain a mixture. Ethanol was evaporated from the mixture by using a rotary evaporator at 35° C. Then, 1.35 g of poly(ethylene glycol) ($PEG_{500}$), having a weight average molecular weight (Mw) of 500, was dissolved in the mixture to prepare a colloidal solution, and 0.05 N of $NH_4OH$ was added to the colloidal solution to increase the pH to about 4.0. The colloidal solution was poured into a polyethylene mould and remained for about 45 minutes to allow gelation of the colloidal solution. Next, the gel was aged in the polyethylene mould for about 1 day or longer and distilled water was poured for a washing process. The washing process was performed at least three times a day for one day. After about 3 weeks, the gel was air-dried in an oven, and thus a nanoparticle composite ($SiO_2$-$PEG_{500}$) having a weight ratio of $SiO_2$:$PEG_{500}$=100:20 and including a $SiO_2$ nanoparticles having an average particle diameter of about 50 nm surface tethered with $PEG_{500}$ was prepared.

(Preparation of Electrolyte)

Example 1

Preparation of Electrolyte

A polystyrene-b-polyisoprene-polystyrene block copolymer was added to anhydrous tetrahydrofuran to prepare a 5 wt % block copolymer-containing mixture. In the block copolymer, a mixture weight ratio of a polystyrene first block, a polyisoprene second block, and a polystyrene third block was about 11:78:11, and a number average molecular weight of the block copolymer was about 100,000 Daltons.

Lithium bis(fluorosulfonyl)imide (LiFSl), ($LiN(SO_2F)_2$) and the $SiO_2$-$PEG_{500}$ prepared in Preparation Example 1 were added to the block copolymer-containing mixture to prepare an electrolyte composition. Here, an amount of LiFSl was about 30 parts by weight based on 100 parts by weight of the block copolymer. An amount of the SiO$_2$-PEG$_{500}$ was about 5 parts by weight based on 100 parts by weight of the block copolymer.

The electrolyte composition was cast on a substrate, and the casted resultant was placed in an argon glove box to slowly evaporate the tetrahydrofuran (THF) at about 25° C. for about 24 hours and further dried in vacuum at about 40° C. for about 24 hours to prepare an electrolyte (a protection layer) in the form of a layer. Here, a thickness of the electrolyte was in a range of about 2 μm to about 3 μm.

Example 2

Preparation of Electrolyte

An electrolyte (a protection layer) in the form of a layer was prepared in the same manner as in Example 1, except that an amount of the SiO$_2$-PEG$_{500}$ prepared in Preparation Example 1 was about 10 parts by weight, instead of about 5 parts by weight, based on 100 parts by weight of the block copolymer. Here, a thickness of the electrolyte was in a range of about 2 μm to about 3 μm.

Example 3

Preparation of Electrolyte

An electrolyte (a protection layer) in the form of a layer was prepared in the same manner as in Example 1, except that an amount of the SiO$_2$-PEG$_{500}$ prepared in Preparation Example 1 was about 20 parts by weight, instead of about 5 parts by weight, based on 100 parts by weight of the block copolymer. Here, a thickness of the electrolyte was in a range of about 2 μm to about 3 μm.

Example 4

Preparation of Electrolyte

An electrolyte (a protection layer) in the form of a layer was prepared in the same manner as in Example 1, except that an amount of the SiO$_2$-PEG$_{500}$ prepared in Preparation Example 1 was about 50 parts by weight, instead of about 5 parts by weight, based on 100 parts by weight of the block copolymer. Here, a thickness of the electrolyte was in a range of about 2 μm to about 3 μm.

Example 5

Preparation of Electrolyte

A polystyrene-b-poly(ethylene-ran-butylene)-b-polystyrene block copolymer was added to anhydrous tetrahydrofuran to prepare a 5 wt % block copolymer-containing mixture. In the block copolymer, a mixture weight ratio of a polystyrene first block, a poly(ethylene-ran-butylene) second block, and a polystyrene third block was about 14.5:71:14.5. In the poly(ethylene-ran-butylene) block, a mixture weight ratio of a polyethylene block and a polybutylene block was about 1:1, and a number average molecular weight of the block copolymer was about 100,000 Daltons.

Lithium bis(fluorosulfonyl)imide (LiFSl), (LiN(SO$_2$F)$_2$) and the SiO$_2$-PEG$_{500}$ prepared in Preparation Example 1 were added to the block copolymer to prepare an electrolyte composition. Here, an amount of LiFSl was about 30 parts by weight based on 100 parts by weight of the block copolymer. An amount of the SiO$_2$-PEG$_{500}$ was about 5 parts by weight based on 100 parts by weight of the block copolymer.

The electrolyte composition was cast on a substrate, and the casted resultant was placed in an argon glove box to slowly evaporate tetrahydrofuran (THF) from the resultant at about 25° C. for about 24 hours and dried in vacuum at about 40° C. for about 24 hours to prepare an electrolyte (a protection layer) in the form of a layer. Here, a thickness of the electrolyte was in a range of about 2 μm to about 3 μm.

Comparative Example 1

Preparation of Electrolyte

An electrolyte (a protection layer) in the form of a layer was prepared in the same manner as in Example 1, except that LiFSl and SiO$_2$ nanoparticles having an average particle diameter of about 10 nm to about 20 nm (available from Aldrich) were added to the block copolymer-containing mixture to obtain an electrolyte composition instead of adding LiFSl and the SiO$_2$-PEG$_{500}$ prepared in Preparation Example 1 to the block copolymer-containing mixture to obtain an electrolyte composition. Here, an amount of the LiFSl was about 30 parts by weight based on 100 parts by weight of the block copolymer. An amount of the SiO$_2$ nanoparticles was about 50 parts by weight based on 100 parts by weight of the block copolymer. Here, a thickness of the electrolyte was about 6 μm.

Comparative Example 2

Preparation of Electrolyte

An electrolyte (a protection layer) in the form of a layer was prepared in the same manner as in Example 1, except that LiFSl was added to the block copolymer-containing mixture to obtain an electrolyte composition instead of adding LiFSl and the SiO$_2$-PEG$_{500}$ prepared in Preparation Example 1 to the block copolymer-containing mixture to obtain an electrolyte composition. Here, an amount of the LiFSl was about 30 parts by weight based on 100 parts by weight of the block copolymer. Here, a thickness of the electrolyte was about 6 μm.

(Preparation of Lithium Secondary Battery (Full Cell))

Example 6

Preparation of Lithium Secondary Battery (Full Cell)

The electrolyte composition prepared in Example 1 was coated on a lithium metal substrate (having a thickness of about 25 μm) at a thickness of about 5 μm by using doctor blade. The coated resultant was dried at about 25° C. and heat-treated at about 40° C. to prepare a lithium metal negative electrode having an electrolyte formed thereon.

Also, LiCoO$_2$, Super-P, as a conducting agent, (available from Timcal Ltd.), polyvinylidene fluoride ("PVdF"), and N-pyrrolidone were mixed to obtain a positive electrode composition. In the positive electrode composition, a mixture weight ratio of LiCoO$_2$, the conducting agent, and PVdF was about 97:1.5:1.5.

The positive electrode composition was coated on an aluminum foil (having a thickness of about 15 μm) and dried at about 25° C., and the dried resultant was vacuum-dried at about 110° C. to prepare a positive electrode.

An electrolyte prepared by using the electrolyte composition of Example 1 was disposed between the positive electrode and the lithium metal negative electrode to prepare a pouch type lithium secondary battery (full cell) having a capacity of about 200 milliAmp hour (mAh). Here, a polyethylene/polypropylene separator was disposed between the positive electrode and the electrolyte, and a liquid electrolyte was added thereto. The liquid electrolyte was an electrolyte solution prepared by dissolving 1 molar (M) lithium bis(fluorosulfonyl)imide (LiFSI) in a mixture of 1,2-dimethoxyethane ("DME") and 1,1,2,2-tetrafluoroethyl 2,2,3,3-tetrafluoropropyl ether, where a volume ratio of DME and 1,1,2,2-tetrafluoroethyl 2,2,3,3-tetrafluoropropyl ether was 2:8.

Example 7

Preparation of Lithium Secondary Battery (Full Cell)

A lithium secondary battery (full cell) was prepared in the same manner as in Example 6, except that the electrolyte composition prepared in Example 2 was used instead of the electrolyte composition prepared in Example 1.

Example 8

Preparation of Lithium Secondary Battery (Full Cell)

A lithium secondary battery (full cell) was prepared in the same manner as in Example 6, except that the electrolyte composition prepared in Example 3 was used instead of the electrolyte composition prepared in Example 1.

Example 9

Preparation of Lithium Secondary Battery (Full Cell)

A lithium secondary battery (full cell) was prepared in the same manner as in Example 6, except that the electrolyte composition prepared in Example 4 was used instead of the electrolyte composition prepared in Example 1.

Example 10

Preparation of Lithium Secondary Battery (Full Cell)

A lithium secondary battery (full cell) was prepared in the same manner as in Example 6, except that the electrolyte composition prepared in Example 5 was used instead of the electrolyte composition prepared in Example 1.

Comparative Example 3

Preparation of Lithium Secondary Battery (Full Cell)

A lithium secondary battery (full cell) was prepared in the same manner as in Example 6, except that a lithium metal substrate (having a thickness of about 25 μm) was used as the negative electrode.

Comparative Example 4

Preparation of Lithium Secondary Battery (Full Cell)

A lithium secondary battery (full cell) was prepared in the same manner as in Example 6, except that the electrolyte composition prepared in Comparative Example 1 was used instead of the electrolyte composition prepared in Example 1.

Comparative Example 5

Preparation of Lithium Secondary Battery (Full Cell)

A lithium secondary battery (full cell) was prepared in the same manner as in Example 6, except that the electrolyte composition prepared in Comparative Example 2 was used instead of the electrolyte composition prepared in Example 1.

(Preparation of Lithium Secondary Battery (Coin Cell))

Example 11

Preparation of Lithium Secondary Battery (Coin Cell)

A lithium secondary battery (coin cell) was prepared in the same manner as in Example 6, except that an electrolyte solution prepared by dissolving 1.3 M $LiFP_6$ in a mixture solvent including diethylcarbonate and fluoroethylene carbonate at a volume ratio of 6:4 was used instead of the electrolyte solution prepared by dissolving 1M lithium bis(fluorosulfonyl)imide (LiFSI) in a mixture solvent including DME and 1,1,2,2-tetrafluoroethyl 2,2,3,3-tetrafluoropropyl ether at a volume ratio of 2:8.

Example 12

Preparation of Lithium Secondary Battery (Coin Cell)

A lithium secondary battery (coin cell) was prepared in the same manner as in Example 11, except that the electrolyte composition prepared in Example 2 was used instead of the electrolyte composition prepared in Example 1.

Example 13

Preparation of Lithium Secondary Battery (Coin Cell)

A lithium secondary battery (coin cell) was prepared in the same manner as in Example 11, except that the electrolyte composition prepared in Example 3 was used instead of the electrolyte composition prepared in Example 1.

Example 14

Preparation of Lithium Secondary Battery (Coin Cell)

A lithium secondary battery (coin cell) was prepared in the same manner as in Example 11, except that the electrolyte composition prepared in Example 4 was used instead of the electrolyte composition prepared in Example 1.

Example 15

Preparation of Lithium Secondary Battery (Coin Cell)

A lithium secondary battery (coin cell) was prepared in the same manner as in Example 11, except that the electrolyte composition prepared in Example 5 was used instead of the electrolyte composition prepared in Example 1.

Comparative Example 6

Preparation of Lithium Secondary Battery (Coin Cell)

A lithium secondary battery (coin cell) was prepared in the same manner as in Example 11, except that a lithium metal substrate (having a thickness of about 25 μm) was used as the negative electrode.

Comparative Example 7

Preparation of Lithium Secondary Battery (Coin Cell)

A lithium secondary battery (coin cell) was prepared in the same manner as in Example 11, except that the electrolyte composition prepared in Comparative Example 1 was used instead of the electrolyte composition prepared in Example 1.

Comparative Example 8

Preparation of Lithium Secondary Battery (Coin Cell)

A lithium secondary battery (coin cell) was prepared in the same manner as in Example 11, except that the electrolyte composition prepared in Comparative Example 2 was used instead of the electrolyte composition prepared in Example 1.

(Analysis on Surface of Electrolyte (Protection Layer) of Layer Type)

Analysis Example 1

Scanning Electron Microscope (SEM) Image

A surface of each of the electrolytes prepared in Example 4 and Comparative Example 1 was observed using a scanning electron microscope. The results are shown in FIGS. 5A and 5B.

Figure 5A:
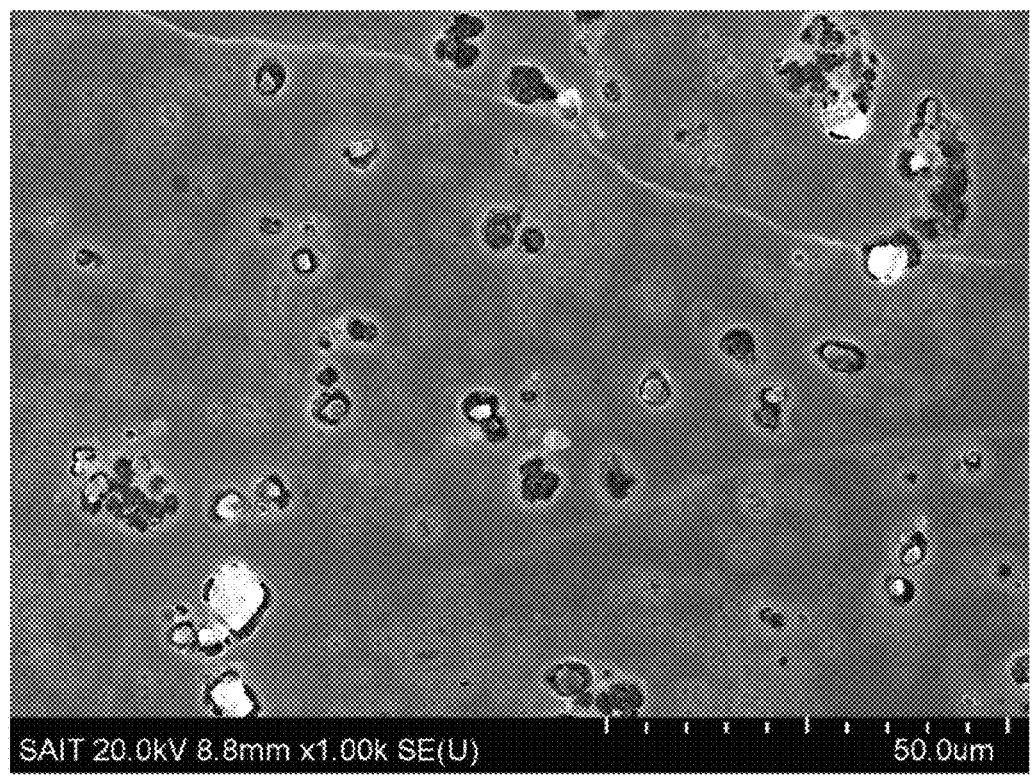
FIGS. 5A and 5B are scanning electron microscope ("SEM") images of the electrolytes prepared in accordance with Example 4 and Comparative Example 1.

Referring to FIG. 5A, the electrolyte prepared in Example 4 has a $SiO_2$-$PEG_{500}$ nanoparticle composite shown as white or black spots that are evenly distributed on a surface of thereof. That is, despite the inclusion of the $SiO_2$-$PEG_{500}$ nanoparticle composite in the electrolyte prepared in Example 4 at a high amount of about 50 parts by weight based on 100 parts by weight of the block copolymer, it may be confirmed that the $SiO_2$-$PEG_{500}$ nanoparticle composite is evenly distributed on a surface of the electrolyte (a protection layer).

Figure 5B:
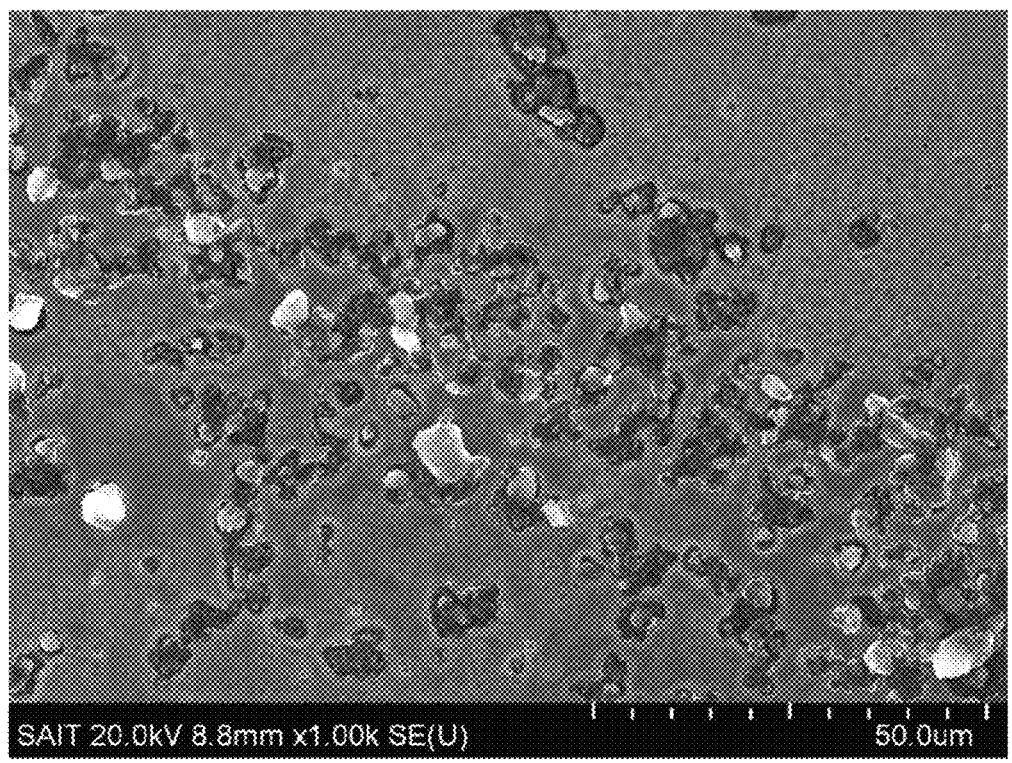

Referring to FIG. 5B, the electrolyte prepared in Comparative Example 1 is shown as white or black spots that are unevenly agglomerated on a surface of thereof.

(Evaluation of Electrochemical Characteristics)

Evaluation Example 1

Impedance Measurement-interfacial Resistance Evaluation

An AC impedance of each of the coin cells prepared in Example 11 and Comparative Examples 6 and 8 was measured by a 4-probe technique using a Solatron SI1260 impedance/gain-phase analyzer in the air at a temperature of 25° C. Here, a frequency range was from 0.1 hertz (Hz) to 1 megahertz (MHz), and an amplitude voltage was about 10 millivolts (mV).

Figure 6A:
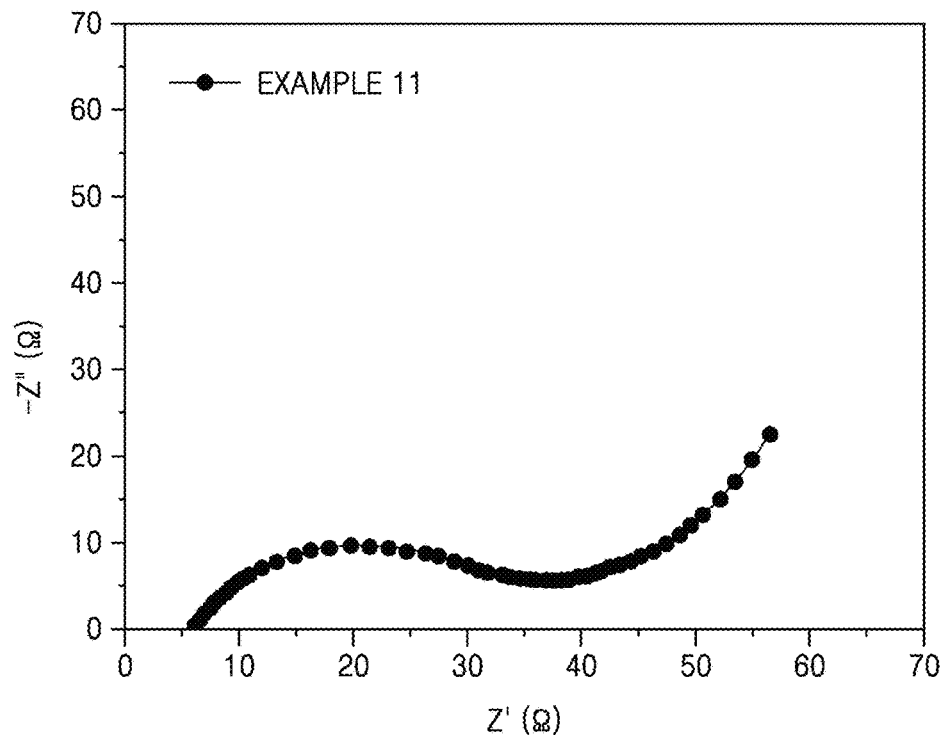
FIGS. 6A and 6B is a graph illustrating the impedance measurement (cycle number versus discharge capacity) of the electrolytes prepared in accordance with Example 11 and Comparative Examples 6 and 8.
Figure 6B:
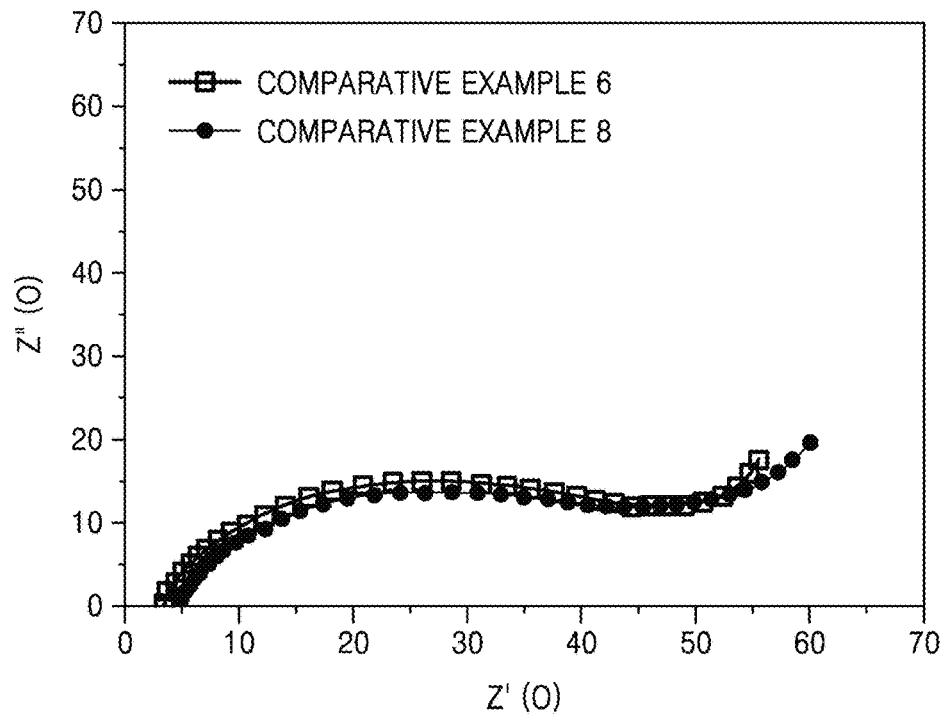

Nyquist plots showing the impedance measurements (cycle number versus discharge capacity) are shown in FIGS. 6A and 6B.

Referring to FIGS. 6A and 6B, an interfacial resistance of an electrode is determined by a location and a size of a semicircle in the graph. A difference between a left x-intercept and a right x-intercept denotes an interfacial resistance of the electrode. It may be confirmed that the electrolyte (a protection layer) included in the coin cell prepared in Example 11 has a slightly reduced interfacial resistance compared to that of the electrolyte (a protection layer) included in the coin cell prepared in Comparative Example 6 or Comparative Example 8.

Evaluation Example 2

Charging/Discharging Characteristics-discharge Capacity and Lifespan Characteristics Evaluation 2-1 Discharge Capacity Evaluation Each of the lithium secondary batteries (full cell) prepared in Example 6 and Comparative Examples 3 and 5 was charged at a constant current of 0.1 C rate at 25° C. until the voltage was about 4.40 volts (V) (vs. Li), and, while maintaining the voltage at 4.40 V in a constant-voltage mode, the charging process was cut-off when a current was 0.05 C rate. Then, the battery was discharged at a constant current of 0.1 C rate until a voltage was 3.0 V (vs. Li) (a formation process, $1^{st}$ cycle). The charging/discharging process was repeated twice more to complete the formation process.

The lithium second battery (full cell) after the formation process was charged at a constant current of 0.7 C within a voltage range of about 3.0 V to about 4.4 V (vs. Li) at 25° C., and a constant current discharging process was performed on the battery with a current of 100 mA at a rate of i) 0.1 C or ii) 0.5 C until a voltage was a cut-off voltage of 4.4 V. The results are shown in Table 2.

TABLE 2

|  | $1^{st}$ discharge capacity (mAh) @ 0.1 C | $1^{st}$ discharge capacity (mAh) @ 0.5 C |
|---|---|---|
| Example 6 | 196.2 | 191.2 |
| Comparative Example 3 | 195.3 | 190.3 |
| Comparative Example 5 | 194.4 | 188.83 |

Referring to Table 2, it may be confirmed that the lithium secondary battery (full cell) prepared in Example 6 has an improved $1^{st}$ discharge capacity at 0.1 C and an improved $1^{st}$ discharge capacity at 0.5 C as compared to those of the lithium secondary battery (full cell) prepared in Comparative Example 3 or Comparative Example 5. In particular, the discharge capacity at 0.1 C of the lithium secondary battery (full cell) prepared in Example 6 was about 0.9 mAh or about 1.8 mAh higher than the discharge capacity at 0.1 C of the lithium secondary battery (full cell) prepared in Comparative Example 3 or Comparative Example 5, respectively. Also, the discharge capacity at 0.5 C of the lithium secondary battery (full cell) prepared in Example 6 was about 0.9 mAh or about 2.37 mAh higher than the discharge capacity at 0.5 C of the lithium secondary battery (full cell) prepared in Comparative Example 3 or Comparative Example 5, respectively.

It is deemed that the increased discharge capacity is due to improved ion conductivity of the lithium secondary battery (full cell) prepared in Example 6.

2-2 Evaluation of Lifespan Characteristics of Lithium Secondary Battery (Full Cell)

Figure 7A:
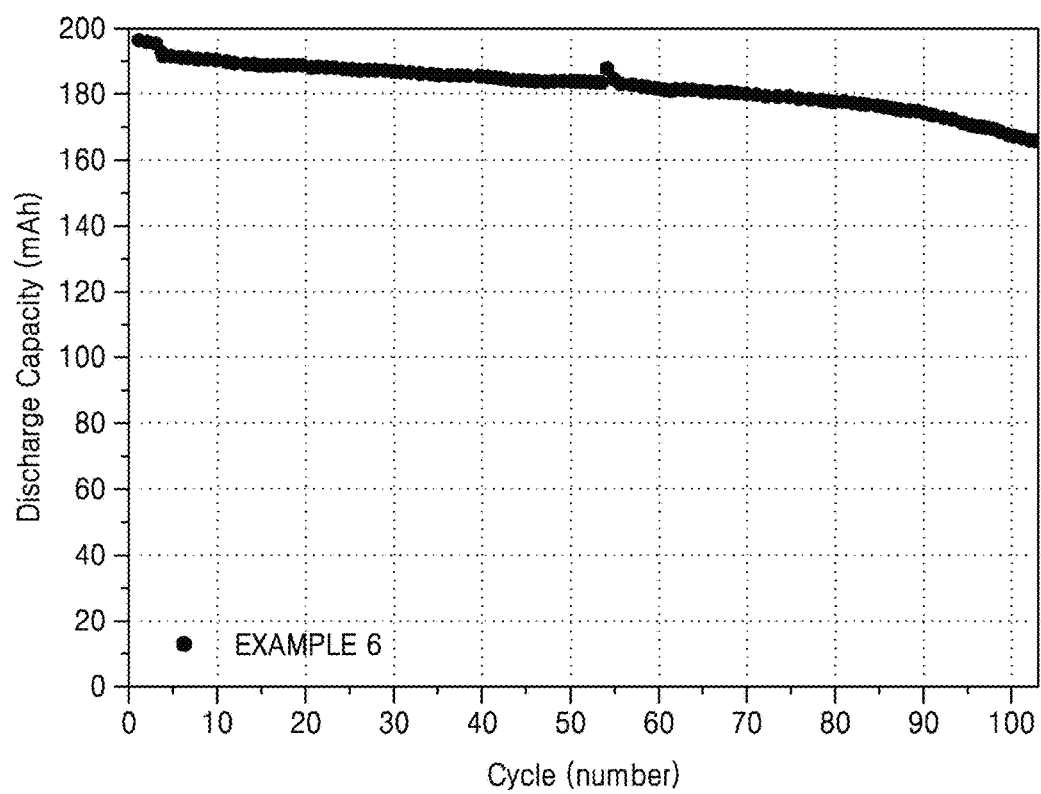
FIGS. 7A to 7C is a graph illustrating the lifespan characteristics of lithium secondary batteries (full cells) prepared in accordance with Example 6, Comparative Example 3, and Example 10.
Figure 7B:
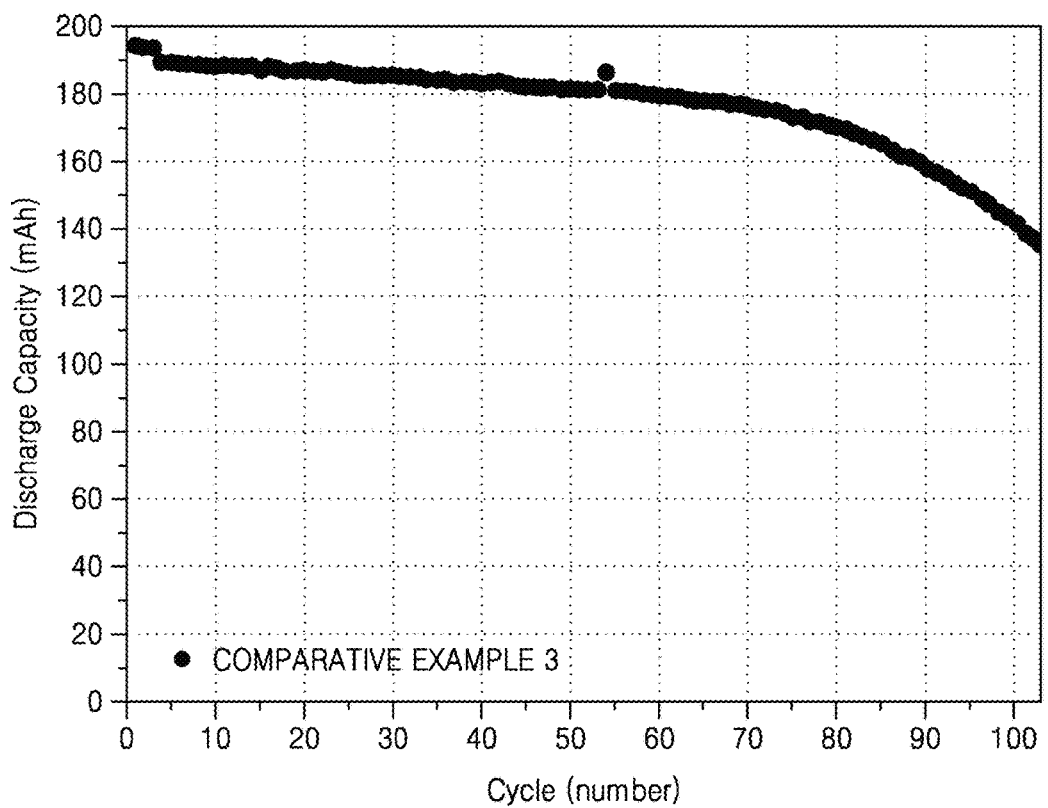
Figure 7C:
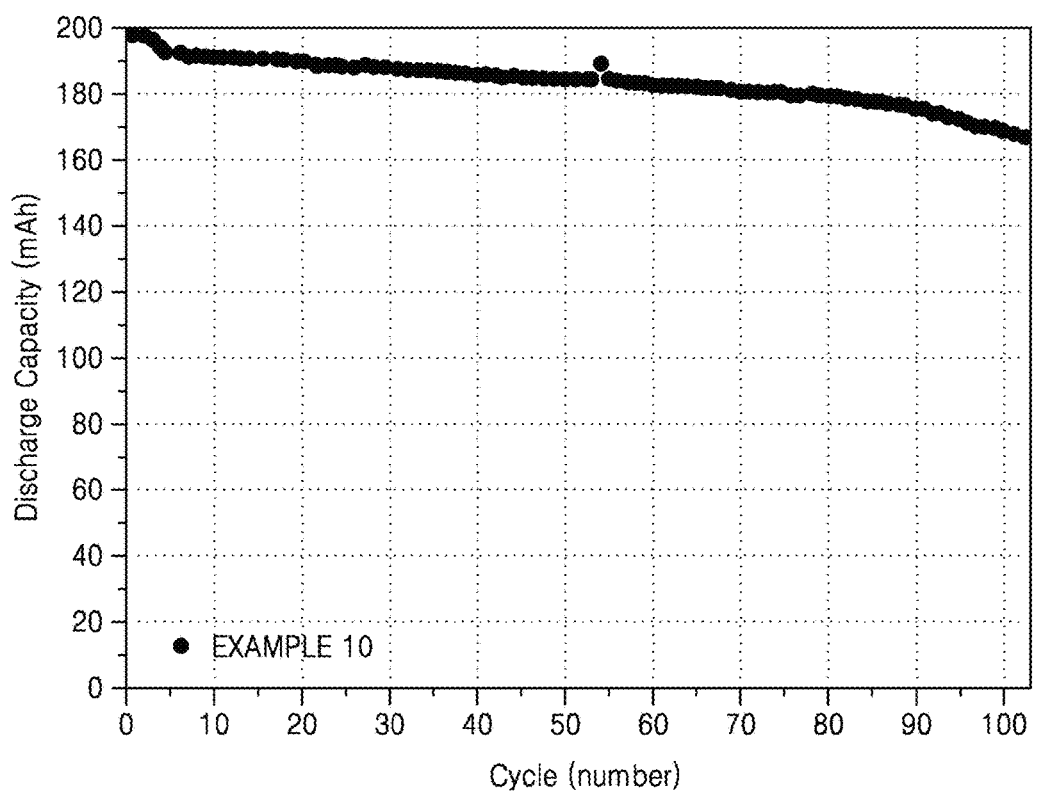

Each of the lithium second batteries (full cell) prepared in Examples 6 and 10, and Comparative Example 3 after the 2-1 formation process was charged at a constant current of 0.7 C within a voltage range of about 3.0 V to about 4.4 V (vs. Li) at 25° C., and a constant current discharging process was performed on the battery with a current of 100 milliamp (mA) at a rate 0.5 C until a voltage was a cut-off voltage of 4.4 V. The charging/discharging process was repeated 99 times thereafter so that the total cycles of the charging/discharging process was 100. The results are shown in FIGS. 7A to 7C. Here, a capacity retention rate was calculated by Equation 2. The results are shown in Table 3.

Capacity retention rate (%)=[(Discharge capacity at $100^{th}$ cycle/discharge capacity at $1^{st}$ cycle)×100]  [Equation 2]

TABLE 3

|  | Capacity retention rate at $100^{th}$ cycle (%) |
|---|---|
| Example 6 | 86.5 |
| Example 10 | 85.0 |
| Comparative Example 3 | 71.5 |

Referring to Table 3, it may be confirmed that capacity retention rates at $100^{th}$ cycle of the lithium secondary batteries (full cell) prepared in Examples 6 and 10 are about 15% higher than that of the lithium secondary battery (full cell) prepared in Comparative Example 3.

2-3 Evaluation of Lifespan Characteristics of Lithium Secondary Battery (Coin Cell)

Each of the lithium secondary batteries (coin cell) prepared in Examples 12 to 14 after the 2-1 formation process were charged at a constant current of 0.7 C within a voltage range of about 3.0 V to about 4.4 V (vs. Li) at 25° C., and a constant current discharging process was performed on the battery with a current of 2.15 mA at a rate 0.2 C until a voltage was a cut-off voltage of 4.4 V.

The charging/discharging process was repeated 89 times thereafter so that the total cycles of the charging/discharging process was 90 cycles. The capacity retention rate was calculated by using Equation 2 with a discharge capacity at $90^{th}$ cycle instead of a discharge capacity at $100^{th}$ cycle. The results are shown in Table 4 and FIG. 8.

TABLE 4

|  | Capacity retention rate at $90^{th}$ cycle (%) |
|---|---|
| Example 12 | 68.5 |
| Example 13 | 78.0 |
| Example 14 | 83.6 |

Figure 8:
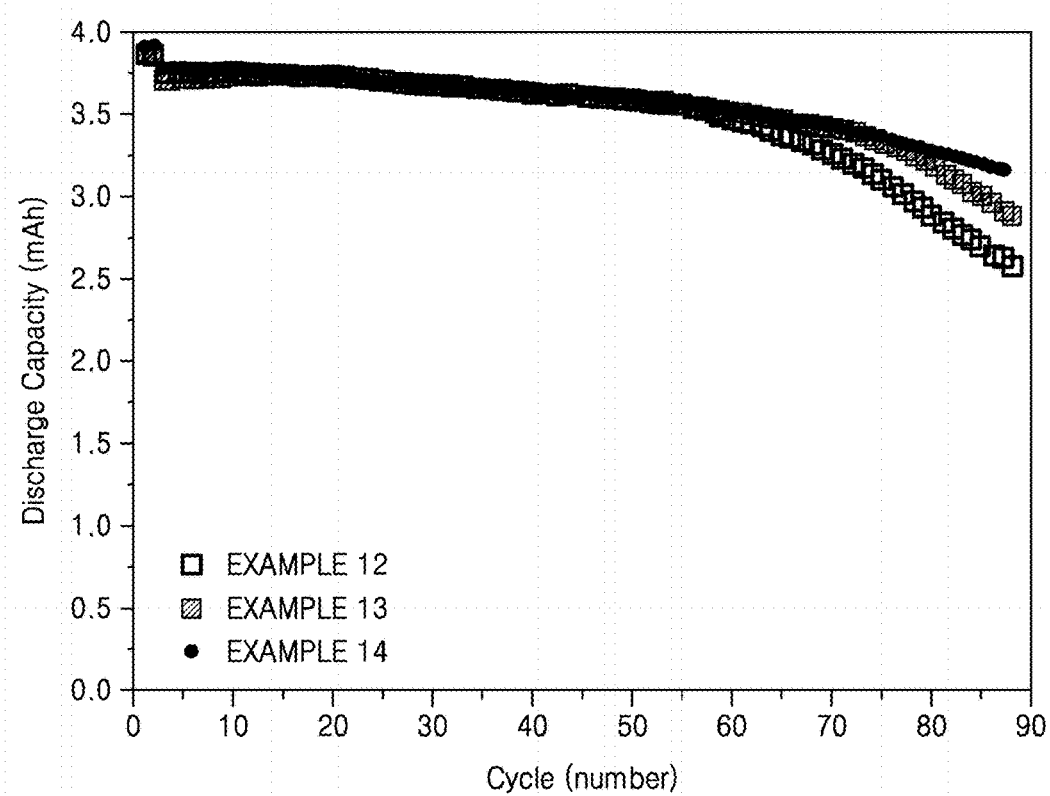
FIG. 8 is a graph illustrating the lifespan characteristics of lithium secondary batteries (coin cells) prepared in accordance with Examples 12 to 14.

Referring to Table 4 and FIG. 8, a capacity retention rate of the lithium secondary battery (coin cell) prepared in Example 14 including the greatest amount of the $SiO_2$-$PEG_{500}$ nanoparticle composite was higher than the other lithium secondary batteries. Also, a capacity retention rate of the lithium secondary battery (coin cell) prepared in Example 12 including the lowest amount of the $SiO_2$-$PEG_{500}$ nanoparticle composite was lower than the other lithium secondary batteries. In this regard, it may be known that lifespan characteristics of the lithium secondary battery (coin cell) improves according to an increase in an amount of $SiO_2$-$PEG_{500}$ nanoparticle composite in the electrolyte.

Evaluation Example 3

Evaluation of Charging/Discharging Characteristics-rate Capability

Each of the lithium secondary batteries (coin cell) prepared in Examples 13 and 14 and Comparative Example 6 was charged at a constant current of 0.1 C rate at 25° C. until a voltage was about 4.40 V (vs. Li), and, while maintaining the voltage at 4.40 V in a constant-voltage mode, the charging process was cut-off when a current was 0.05 C rate. Then, the battery was discharged at a constant current of 0.1 C rate until a voltage was 3.0 V (vs. Li) (a formation process, $1^{st}$ cycle). The charging/discharging process was repeated twice more to complete the formation process.

The lithium second battery after the formation process was charged at a constant current of 0.1 C until a voltage of about 4.4 V (vs. Li) and discharged at a constant current of 0.1 C until a voltage was 3.0 V.

From the $2^{nd}$ cycle, the battery was charged at 4.4V CC/CV 0.5 C, until a current of 0.05 C, and discharged at 3.0 V and a rate of 0.1 C/0.2 C/1.5 C/2.0 C. The cycle evaluation was performed on the battery with 2 cycles of charging the battery at 4.4V CC 1 C and discharging at 3.0V 1 C.

Figure 9:
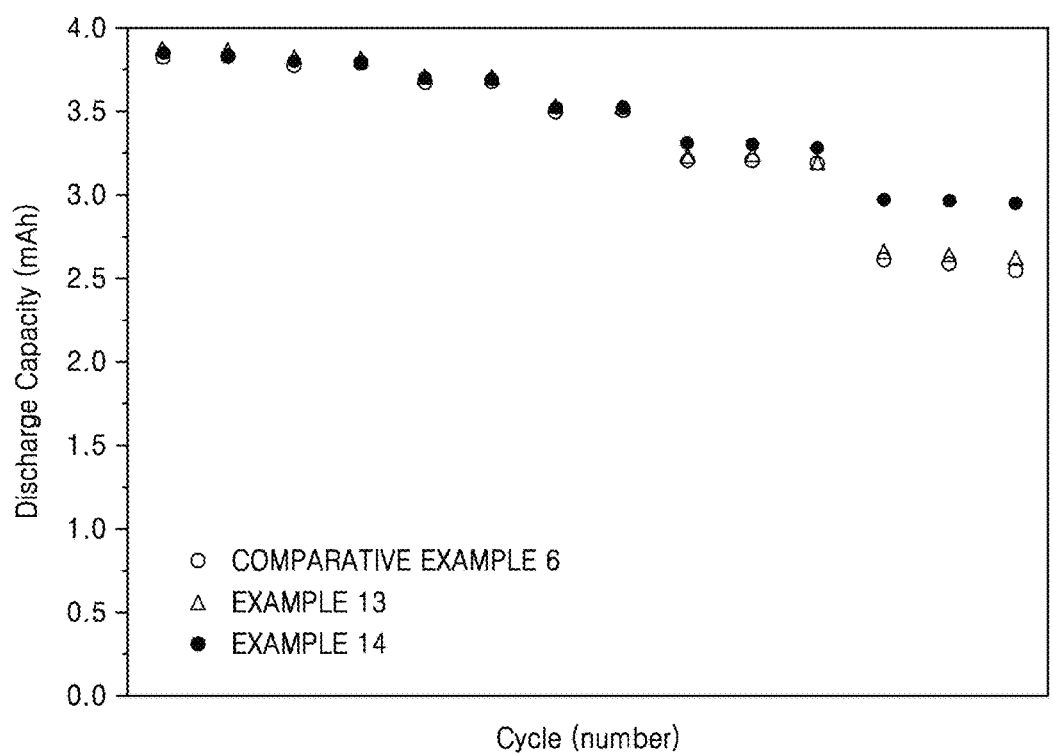
FIG. 9 is a graph illustrating the results of rate capability evaluation of lithium secondary batteries (coin cells) prepared in accordance with Examples 13 and 14 and Comparative Example 6.

Also, changes in a discharge capacity of the lithium secondary batteries (coin cell) prepared in Examples 13 and 14 and Comparative Example 6 are shown in FIG. 9.

A rate capability of each of the lithium secondary batteries was calculated by using Equation 3, and the results are shown in Table 5.

Rate capability (%)=[(Discharge capacity when a cell is discharged with a current at 1.5 C or 2 C)/(Discharge capacity when a cell is discharged with a current at 0.2 C)}×100]  [Equation 3]

TABLE 5

|  | Rate capability (at 1.5 C/0.2 C) (%) | Rate capability (at 2 C/0.2 C) (%) |
|---|---|---|
| Example 13 | 85.4 | 71.5 |
| Example 14 | 87.2 | 78.3 |
| Comparative Example 6 | 85.2 | 69.2 |

Referring to Table 5 and FIG. 9, it may be confirmed that rate capabilities (1.5 C/0.2 C) of the lithium secondary batteries (coin cell) prepared in Examples 13 and 14 were about 0.2% and about 2.0%, respectively, increased compared to that of the lithium secondary battery (coin cell) prepared in Comparative Example 6. Also, rate capabilities (2.0 C/0.2 C) of the lithium secondary batteries (coin cell) prepared in Examples 13 and 14 were about 2.3% and about 9.1%, respectively, increased compared to that of the lithium secondary battery (coin cell) prepared in Comparative Example 6

As described above, according to one or more exemplary embodiments, an electrolyte for a lithium battery may include a block copolymer and a surface-modified nanoparticle composite dispersed in the block copolymer in order to have good mechanical properties and improved ion conductivity at the same time at room temperature. Also, electrochemical characteristics of a lithium battery including the electrolyte may be improved.

It should be understood that exemplary embodiments described herein should be considered in a descriptive sense only and not for purposes of limitation. Descriptions of features or aspects within each exemplary embodiment should typically be considered as available for other similar features or aspects in other exemplary embodiments.

While one or more exemplary embodiments have been described with reference to the figures, it will be understood by those of ordinary skill in the art that various changes in form and details may be made therein without departing from the spirit and scope as defined by the following claims.

What is claimed is:

1. An electrolyte for a lithium battery, the electrolyte comprising:
    a block copolymer; and
    a nanoparticle composite dispersed in the block copolymer,
    wherein the block copolymer comprises
        a structural domain comprising a polymer comprising a structural repeating unit; and
        a rubbery domain comprising a polymer comprising a rubber repeating unit, or a hard domain comprising a polymer comprising an olefin-based repeating unit,
        wherein the nanoparticle composite is dispersed only in the rubbery domain or the hard domain of the block copolymer, and comprises nanoparticles having a surface and an ion conductive functional oligomer or polymer attached to the surface,
        wherein the polymer comprising a rubber repeating unit is at least one selected from polyisoprene, polybutadiene, polychloroprene, polyisobutylene, and polyurethane, and the polymer comprising an olefin-based repeating unit is at least one selected from polypropylene and polybutylene.

2. The electrolyte of claim 1, wherein the block copolymer has a number average molecular weight in a range of about 10,000 Daltons to about 500,000 Daltons.

3. The electrolyte of claim 1, wherein the block copolymer is at least one selected from a diblock copolymer comprising a polystyrene first block and a polyisoprene second block; a triblock copolymer comprising a polystyrene first block, a polyisoprene second block, and a polystyrene third block; a diblock copolymer comprising a polystyrene first block and a polybutadiene second block; and a triblock copolymer comprising a polystyrene first block, a polybutadiene second block, and a polystyrene third block.

4. The electrolyte of claim 1, wherein the ion conductive functional oligomer or polymer comprises at least one selected from poly(ethylene oxide), poly(propylene oxide), poly(butylene oxide), poly(siloxane), poly(ethylene glycol), poly(propylene glycol), poly(oxyethylene)methacrylate, poly(ethylene glycol)diacrylate, poly(propylene glycol)diacrylate, poly(ethylene glycol)dimethacrylate, poly(propylene glycol)dimethacrylate, poly(ethylene glycol)urethane diacrylate, poly(ethylene glycol)urethane dimethacrylate, polyester diacrylate, polyester dimethacrylate, poly(ethylene glycol) urethane triacrylate, poly(ethylene glycol) urethane trimethacrylate, trimethylolpropane triacrylate, trimethylolpropane trimethacrylate, poly(ethylene oxide) grafted poly(methylmethacrylate), poly(propylene oxide) grafted poly(methylmethacrylate), poly(butylene oxide) grafted poly(methylmethacrylate), polysiloxane grafted poly(methylmethacrylate), poly(ethylene glycol) grafted poly(methylmethacrylate), poly(propylene glycol) grafted poly(methylmethacrylate), trimethylolpropane triacrylate substituted with an ethoxy group, and trimethylolpropane triacrylate substituted with a propoxy group.

5. The electrolyte of claim 1, wherein a weight average molecular weight (Mw) of the ion conductive oligomer or polymer is in a range of about 50 to about 20,000 Daltons.

6. The electrolyte of claim 1, wherein an amount of the ion conductive oligomer or polymer is in a range of about 5 parts by weight to about 20 parts by weight based on 100 parts by weight of the nanoparticle composite.

7. The electrolyte of claim 1, wherein the nanoparticle composite comprises nanoparticles comprising at least one selected from $SiO_2$, $Al_2O_3$, $TiO_2$, ZnO, $BaTiO_3$, and a lithium ion conductor.

8. The electrolyte of claim 1, wherein the nanoparticle composite comprises nanoparticles having an average particle diameter of about 1 nm to about 1 µm.

9. The electrolyte of claim 1, wherein an amount of the nanoparticle composite is in a range of about 5 parts by weight to about 500 parts by weight based on 100 parts by weight of the block copolymer.

10. The electrolyte of claim 1, wherein the nanoparticle composite comprises at least one selected from poly(ethylene glycol) attached to a $SiO_2$ nanoparticle surface ($SiO_2$-PEG), poly(ethylene glycol) attached to a $Al_2O_3$ nanoparticle surface ($Al_2O_3$-PEG), poly(ethylene glycol) attached to a $TiO_2$ nanoparticle surface ($TiO_2$-PEG), and poly(ethylene glycol) attached to a lithium aluminum germanium titanium phosphate nanoparticle surface (LAGTP-PEG).

11. The electrolyte of claim 1 further comprising at least one of a lithium salt and an ionic liquid, wherein the lithium salt is at least one selected from LiSCN, $LiN(CN)_2$, $LiClO_4$, $LiBF_4$, $LiAsF_6$, $LiPF_6$, $LiCF_3SO_3$, $Li(CF_3SO_2)_2N$, $Li(CF_3SO_2)_3C$, $LiN(SO_2F)_2$, $LiN(SO_2C_2F_5)_2$, $LiN(SO_2CF_3)_2$, $LiN(SO_2CF_2CF_3)_2$, $LiSbF_6$, $LiPF_3(CF_2CF_3)_3$, $LiPF_3(C_2F_5)_3$, $LiPF_3(CF_3)_3$, and $LiB(C_2O_4)_2$.

12. The electrolyte of claim 1, wherein ion conductivity of the electrolyte composition is greater than or equal to about $1 \times 10^{-4}$ S/cm as measured at a temperature of 25° C.

13. A negative electrode for a lithium battery, the negative electrode comprising:
    a substrate comprising lithium metal or a lithium-containing alloy; and
    a protection layer comprising an electrolyte disposed on at least a portion of the substrate,
    wherein the electrolyte comprises a nanoparticle composite dispersed in a block copolymer, the block copolymer comprising:
        a structural domain comprising a polymer comprising a structural repeating unit; and a rubbery domain comprising a polymer comprising a rubber repeating unit or a hard domain comprising a polymer comprising an olefin-based repeating unit, wherein the nanoparticle composite is dispersed only in the rubbery domain or the hard domain of the block copolymer, and comprises nanoparticles having a surface and an ion conductive functional oligomer or polymer attached to the surface, wherein the polymer comprising a rubber repeating unit is polyisoprene, polybutadiene, polychloroprene, polyisobutylene, polyurethane, or a combination thereof, and the polymer comprising an olefin-based repeating unit is polypropylene, polybutylene, or a combination thereof.

14. The negative electrode of claim 13, wherein a thickness of the protection layer is in a range of about 0.5 μm to about 5 μm.

15. A lithium battery comprising:
a positive electrode;
a negative electrode of claim 13; and
an electrolyte disposed between the positive electrode and the negative electrode,
wherein the electrolyte comprises a nanoparticle composite dispersed in a block copolymer, the block copolymer comprising:
a structural domain comprising a polymer comprising a structural repeating unit; and
a rubbery domain comprising a polymer comprising a rubber repeating unit or a hard domain comprising a polymer comprising an olefin-based repeating unit,
wherein the nanoparticle composite is dispersed only in the rubbery domain or the hard domain of the block copolymer, and comprises nanoparticles having a surface and an ion conductive functional oligomer or polymer attached to the surface.

* * * * *